United States Patent
Huang et al.

(10) Patent No.: US 12,096,428 B2
(45) Date of Patent: Sep. 17, 2024

(54) COMMUNICATION METHOD AND APPARATUS

(71) Applicant: HUAWEI TECHNOLOGIES CO., LTD., Guangdong (CN)

(72) Inventors: Wenwen Huang, Shanghai (CN); Xiaolei Tie, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 439 days.

(21) Appl. No.: 17/492,165

(22) Filed: Oct. 1, 2021

(65) Prior Publication Data

US 2022/0030609 A1     Jan. 27, 2022

Related U.S. Application Data

(63) Continuation of application No. PCT/CN2020/082313, filed on Mar. 31, 2020.

(30) Foreign Application Priority Data

Apr. 2, 2019   (CN) .......................... 201910263102.5
Jun. 29, 2019  (CN) .......................... 201910581390.9
Aug. 16, 2019  (CN) .......................... 201910760953.0

(51) Int. Cl.
*H04L 5/00* (2006.01)
*H04W 52/02* (2009.01)
(Continued)

(52) U.S. Cl.
CPC ....... *H04W 72/1273* (2013.01); *H04L 5/0053* (2013.01); *H04W 72/0446* (2013.01); *H04W 72/23* (2023.01)

(58) Field of Classification Search
None
See application file for complete search history.

(56) References Cited

U.S. PATENT DOCUMENTS 11,330,575 B2 *   5/2022  Lin .................. H04W 80/08
2016/0150541 A1   5/2016  Park et al.
2018/0332655 A1  11/2018  Ang et al.

FOREIGN PATENT DOCUMENTS

CN     105589506 A     5/2016
CN     107079333 A     8/2017
(Continued)

OTHER PUBLICATIONS

Office Action issued in Indian Application No. 202147046563 on Mar. 17, 2022, 6 pages.
(Continued)

*Primary Examiner* — Ajit Patel
(74) *Attorney, Agent, or Firm* — Fish & Richardson P.C.

(57) ABSTRACT

Communication methods and apparatuses are provided in this disclosure. One method includes: receiving, by a terminal device at time slot n, first downlink control information comprising a minimum slot offset value, wherein the minimum slot offset value is to be applied by the terminal device at time slot n+K, where K is a positive integer; receiving, by the terminal device at a time after the time slot n and before the time slot n+K, second downlink control information comprising the minimum slot offset value; and determining, by the terminal device, to apply the minimum slot offset value at the time slot n+K.

16 Claims, 13 Drawing Sheets

(51) Int. Cl.
*H04W 72/0446* (2023.01)
*H04W 72/1273* (2023.01)
*H04W 72/23* (2023.01)

(56) References Cited

FOREIGN PATENT DOCUMENTS

| CN | 107332646 A | 11/2017 | | |
|---|---|---|---|---|
| CN | 108292969 A | 7/2018 | | |
| EP | 3592063 A1 | * | 1/2020 | ............... H04L 5/00 |
| EP | 3598816 A1 | * | 1/2020 | ............ H04W 72/04 |
| WO | 2014133320 A1 | 9/2014 | | |
| WO | 2018167958 A1 | 9/2018 | | |
| WO | 2018170656 A1 | 9/2018 | | |
| WO | 2018203650 A1 | 11/2018 | | |
| WO | 2019052348 A1 | 3/2019 | | |

OTHER PUBLICATIONS

3GPP TS 38.212 V15.5.0 (Mar. 2019), "3rd Generation Partnership Project; Technical Specification Group Radio Access Network;NR;Multiplexing and channel coding(Release 15)," Mar. 2019, 101 pages.
3GPP TS 38.214 V15.5.0 (Mar. 2019), "3rd Generation Partnership Project; Technical Specification Group Radio Access Network;NR;Physical layer procedures for data(Release 15)," Mar. 2019, 103 pages.
Huawei et al., "Corrections on scheduling and HARQ," 3GPP TSG RAN WG1 Meeting #95, R1-1812184, Spokane, USA, Nov. 12-16, 2018, 6 pages.
PCT International Search Report and Written Opinion issued in International Application No. PCT/CN2020/082313 on Jul. 6, 2020, 15 pages (with English translation).
3GPP TR 38.840 V1.0.0 (Mar. 2019), "3rd Generation Partnership Project; Technical Specification Group Radio Access Network; NR; Study on UE Power Saving (Release 16)," Mar. 2019, 69 pages.
Extended European Search Report issued in European Application No. 20782490.5 on May 11, 2022, May 11, 2022, 12 pages.
LG Electronics, "Text proposals on CSI acquisition," 3GPP TSG RAN WG1 #94, R1-1808486, Gothenburg, Sweden, Aug. 20-24, 2018, 6 pages.
Office Action in Japanese Appln. No. 2021-558872, mailed on Jul. 25, 2023, 7 pages (with English translation).

* cited by examiner

COMMUNICATION METHOD AND APPARATUS

CROSS-REFERENCE TO RELATED APPLICATIONS

This application is a continuation of International Application No. PCT/CN2020/082313, filed on Mar. 31, 2020, which claims priority to Chinese Patent Application No. 201910263102.5, filed on Apr. 2, 2019, Chinese Patent Application No. 201910581390.9, filed on Jun. 29, 2019, and Chinese Patent Application No. 201910760953.0, filed on Aug. 16, 2019. All of the aforementioned patent applications are hereby incorporated by reference in their entireties.

TECHNICAL FIELD

This application relates to the field of communications technologies, and in particular, to a communication method and apparatus.

BACKGROUND

Power consumption of a terminal device in a communications system is an important aspect of user experience. A 3rd generation partnership project (3rd generation partnership project, 3GPP) release (Release 16) proposes that power consumption of a terminal device in a new radio (new radio, NR) system needs to be optimized. One method for optimizing power consumption of a terminal device is to enhance a mechanism of scheduling data by a base station. The following describes a process of scheduling data by a base station in an existing protocol.

In a protocol of a 3GPP Release 15, a base station configures, for a terminal device by using radio resource control (radio resource control, RRC) signaling, or a base station and a terminal device predefine a time domain resource assignment list (time domain resource assignment list) of a physical downlink shared channel (physical downlink shared channel, PDSCH) or a time domain resource assignment list (or referred to as a time domain resource assignment set) of a physical uplink shared channel (physical uplink shared channel, PUSCH). The time domain resource assignment list includes a slot offset between a physical downlink control channel (physical downlink control channel, PDCCH) and the scheduled PDSCH or between a PDCCH and the scheduled PUSCH, and a start symbol and a length of the PDSCH or PUSCH in a slot. A value of the slot offset in the time domain resource assignment list may be greater than or equal to 0, and a plurality of values may be configured. For example, slot offsets may be configured as {0, 1, 2, 3, 4, 5, 6}. When the base station actually performs scheduling for the terminal device, one of the slot offsets is indicated by using the PDCCH, to represent a time domain location of the currently scheduled PDSCH or PUSCH. If the slot offset indicated by the PDCCH is 0, it indicates that the scheduled PDSCH or PUSCH is in a same slot as the PDCCH. The base station can schedule any value in the time domain resource assignment list, and the terminal device can determine a currently scheduled slot offset only after completing PDCCH detection. Therefore, when starting to detect the PDCCH, the terminal device always needs to assume that the slot offset indicated by the PDCCH may be a minimum value in the time domain resource assignment list. If values in the time domain resource assignment list include 0, the PDSCH or PUSCH scheduled by the base station may be in a same slot as the PDCCH, and even the PDSCH and the PDCCH may have a same start symbol. For downlink scheduling, the terminal device needs to buffer data on an entire bandwidth during each time of PDCCH detection, because before completing the PDCCH detection, the terminal device does not know a time-frequency domain resource location of the PDSCH, and even does not know whether the PDSCH is scheduled. This causes a waste of power of the terminal device. For an uplink scheduling, similarly, the terminal device does not know a location of the PUSCH scheduled through the PDCCH, and even does not know whether the PUSCH is scheduled, and the PDCCH may be in a same slot as the PUSCH. In this case, the terminal device is required to complete PDCCH detection as soon as possible. Otherwise, the terminal device cannot send data of the PUSCH in time. This also causes a waste of power.

Based on this, it may be specified that a slot offset K for the uplink or downlink scheduling does not include 0 (that is, before PDCCH detection, the terminal device knows that cross-slot scheduling is performed), in other words, K>x, and x is greater than or equal to 0. In this case, the terminal device may save power consumption in the following aspects:

reducing unnecessary buffering, mainly PDSCH buffering; and increasing PDCCH processing time, which can be improved in both the uplink and downlink scheduling. During implementation of the terminal device, if the PDCCH processing time is very short, the terminal device has relatively high requirements for a clock rate and a voltage, and relatively large power consumption is caused; or if the PDCCH processing time is sufficient, the terminal has relatively low requirements for a clock rate and a voltage, and relatively small power consumption is caused.

Although K>x can save the power consumption of the terminal device, compared with that the time domain resource assignment list includes 0, in other words, K>0 (that is, same-slot scheduling), a disadvantage of K>x is an increase in a latency, in other words, there is a specific gap (gap) between the PDSCH or PUSCH and the PDCCH during scheduling by the base station, causing an increase in a transmission latency. Therefore, considering both a latency and power consumption, a time domain resource assignment set for scheduling needs to be dynamically switched. However, a conventional technology does not provide a reliable solution for dynamically switching a time domain resource assignment set.

SUMMARY

This application provides a communication method and a communications apparatus, to consider both power consumption and a transmission latency of a terminal device during data scheduling.

According to a first aspect, a communication method is provided. The method includes: receiving first information from a network device at first time, where the first information is carried on a first physical downlink control channel PDCCH, a first physical downlink shared channel PDSCH is scheduled through the first PDCCH based on first time domain resource assignment set at the first time, the first information is used to determine second time domain resource assignment set for scheduling a second PDSCH after the first time, and the first PDCCH that carries the first information further includes scheduling information of the first PDSCH; receiving data sent by the network device through the first PDSCH; sending feedback information of the data to the network device; and scheduling the second PDSCH based on the second time domain resource assignment set at second time after the feedback information of the data is sent, where the second time is later than the first time. In this aspect, during data scheduling, time domain resource assignment sets used at different time may be explicitly indicated based on an actual requirement, balancing power consumption and a transmission latency of the terminal device. In addition, this avoids that the base station and the terminal device are inconsistent in behavior due to missing detection of the terminal device, and ensures reliability of dynamically switching a time domain resource assignment set.

In an implementation, the first PDCCH that carries the first information does not include the scheduling information of the first PDSCH, and the method further includes: sending feedback information of the first PDCCH to the network device; and scheduling the second PDSCH based on the second time domain resource assignment set at third time after the feedback information of the first PDCCH is sent. In this implementation, to prevent a network side and a terminal device side from inconsistently understanding scheduling information due to missing detection of the first information, a new time domain resource assignment set may be validated only after the feedback information of the first PDCCH is sent.

According to a second aspect, a communication method is provided. The method includes: sending first information to a terminal device at first time, where the first information is carried on a first physical downlink control channel PDCCH, a first physical downlink shared channel PDSCH is scheduled through the first PDCCH based on a first time domain resource assignment set at the first time, the first information is used to determine a second time domain resource assignment set for scheduling a second PDSCH after the first time, and the first PDCCH that carries the first information further includes scheduling information of the first PDSCH; sending data to the terminal device through the first PDSCH; receiving feedback information of the data from the terminal device; and scheduling the second PDSCH based on the second time domain resource assignment set at second time after the feedback information of the data is received, where the second time is later than the first time. In this aspect, during data scheduling, time domain resource assignment sets used at different time may be explicitly indicated based on an actual requirement, balancing power consumption and a transmission latency of the terminal device.

In an implementation, the first PDCCH that carries the first information does not include the scheduling information of the first PDSCH, and the method further includes: receiving feedback information of the first PDCCH from the terminal device; and scheduling the second PDSCH based on the second time domain resource assignment set at third time after the feedback information of the first PDCCH is received.

According to a third aspect, a communication method is provided. The method includes: receiving first information from a network device at first time, where the first information is carried on a first physical downlink control channel PDCCH, the first PDCCH includes scheduling information of a first physical uplink shared channel PUSCH, the first PUSCH is scheduled based on a first time domain resource assignment set at the first time, and the first information is used to determine a second time domain resource assignment set for scheduling a second PUSCH after the first time; sending data to the network device through the first PUSCH based on the scheduling information of the first PUSCH; and scheduling the second PUSCH based on the second time domain resource assignment set at second time after the data is sent, where the second time is later than the first time. In this aspect, during data scheduling, time domain resource assignment sets used at different time may be explicitly indicated based on an actual requirement, balancing power consumption and a transmission latency of the terminal device. In addition, this avoids that the base station and the terminal device are inconsistent in behavior due to missing detection of the terminal device is avoided, and ensures reliability of dynamically switching a time domain resource assignment set.

According to a fourth aspect, a communication method is provided. The method includes: sending first information to a terminal device at first time, where the first information is carried on a first physical downlink control channel PDCCH, the first PDCCH includes scheduling information of a first physical uplink shared channel PUSCH, the first PUSCH is scheduled based on a first time domain resource assignment set at the first time, and the first information is used to determine a second time domain resource assignment set for scheduling a second PUSCH after the first time; receiving data sent by the terminal device through the first PUSCH; and scheduling the second PUSCH based on the second time domain resource assignment set at second time after the data is received, where the second time is later than the first time.

With reference to any one or any implementation of the first aspect to the fourth aspect, in another implementation, the first time domain resource assignment set includes one or more slot offset values, and the slot offset value is greater than or equal to 0; and the second time domain resource assignment set includes one or more slot offset values, and the slot offset value is greater than 0; or the first time domain resource assignment set includes one or more slot offset values, and the slot offset value is greater than 0; and the second time domain resource assignment set includes one or more slot offset values, and the slot offset value is greater than or equal to 0.

According to a fifth aspect, a communication method is provided. The method includes: receiving first information from a network device at first time, where the first information is carried on a first physical downlink control channel PDCCH, and a first physical downlink shared channel PDSCH or a first physical uplink shared channel PUSCH is scheduled through the first PDCCH based on a first time domain resource assignment set at the first time; determining, based on bits in a time domain resource assignment field of the first PDCCH when bits in a frequency domain resource assignment field of the first PDCCH are all 0, a second time domain resource assignment set for scheduling a second PDSCH or a second PUSCH after the first time; and scheduling the second PDSCH or the second PUSCH based on the determined first time domain resource assignment set at second time, where the second time is later than the first time. In this aspect, when the first information is not used for scheduling, the time domain resource assignment set may be indicated by using the bits in the time domain resource assignment field of the first information, so that time domain resource assignment sets used at different time may be explicitly indicated based on an actual requirement, balancing power consumption and a transmission latency of the terminal device. In addition, this avoids that the base station and the terminal device are inconsistent in behavior due to missing detection of the terminal device is avoided, and ensures reliability of dynamically switching a time domain resource assignment set.

In an implementation, the determining, based on bits in a time domain resource assignment field of the first PDCCH when bits in a frequency domain resource assignment field of the first PDCCH are all 0, a second time domain resource assignment set for scheduling a second PDSCH or a second PUSCH after the first time includes: determining a minimum slot offset value or an index of a minimum slot offset value in the first time domain resource assignment set based on the bits in the time domain resource assignment field of the first PDCCH when the bits in the frequency domain resource assignment field of the first PDCCH are all 0.

According to a sixth aspect, a communication method is provided. The method includes: sending first information to a terminal device at first time, where the first information is carried on a first physical downlink control channel PDCCH, a first physical downlink shared channel PDSCH or a first physical uplink shared channel PUSCH is scheduled through the first PDCCH based on a first time domain resource assignment set at the first time, bits in a frequency domain resource assignment field of the first PDCCH are all 0, and bits in a time domain resource assignment field of the first PDCCH are used to determine a second time domain resource assignment set for scheduling a second PDSCH or a second PUSCH after the first time; and scheduling the second PDSCH or the second PUSCH based on the determined first time domain resource assignment set at second time, where the second time is later than the first time.

According to a seventh aspect, a communication method is provided. The method includes: receiving first downlink control information from a network device, where the first downlink control information is carried on a first physical downlink control channel PDCCH; and determining a first minimum slot offset value based on a first field of the first downlink control information, where the first field includes at least one of the following fields: a frequency domain resource assignment field, a time domain resource assignment field, a modulation and coding scheme field, a new data indicator field, or a redundancy version field, and the first minimum slot offset value represents a minimum available slot offset value for receiving a physical downlink shared channel PDSCH or sending a physical uplink shared channel PUSCH. In this aspect, the first field of the downlink control information is reused to determine the minimum slot offset value, so that a quantity of bits of the control information is not increased and overheads of the control information are reduced, and further signaling reliability can be improved based on HARQ-ACK feedback.

In an implementation, the first downlink control information further includes first indication information, and the first indication information is used to indicate that the first field carries indication information of the first minimum slot offset value. In this implementation, the first indication information is used to explicitly indicate that the first field is currently reused, and the first field is used to carry the indication information of the minimum slot offset value.

In another implementation, the determining a minimum slot offset value based on a first field of the first downlink control information includes: obtaining a value of the time domain resource assignment field when one or more fields in the first field of the first downlink control information are first set values, where the value of the time domain resource assignment field is used to indicate the first minimum slot offset value. In this implementation, when the one or more fields in the first field are the first set values, the value of the time domain resource assignment field is used to indicate the minimum slot offset value. It may be understood that the one or more fields in the first field are the first set values, and all the fields may correspond to different set values.

In another implementation, the determining a first minimum slot offset value based on a first field of the first downlink control information includes: obtaining a preconfigured or predefined first minimum slot offset value when one or more fields in the first field of the first downlink control information are first set values. In this implementation, when the one or more fields in the first field are the first set values, the minimum slot offset value may be a preconfigured or predefined value.

In another implementation, the receiving first downlink control information from a network device includes: receiving the first downlink control information at a first moment, where an application moment of the first downlink control information is not earlier than a second moment; and the method further includes: receiving second downlink control information at a third moment, where the third moment is between the first moment and the second moment, the second downlink control information is used to indicate a second minimum slot offset value, and an application moment of the second downlink control information is not earlier than a fourth moment; and determining a used minimum slot offset value and an application moment of the used minimum slot offset value based on the first downlink control information and/or the second downlink control information, where the used minimum slot offset value is one of the first minimum slot offset value and the second minimum slot offset value, and the application moment is not earlier than one of the second moment and the fourth moment. In this implementation, if the second downlink control information is further received before the application moment of the first downlink control information, the used minimum slot offset value and the application moment of the used minimum slot offset value are determined based on the first downlink control information and/or the second downlink control information, to resolve a conflict between minimum slot offset values indicated by a plurality of pieces of downlink control information.

In another implementation, the first field is the frequency domain resource assignment field, and the determining a first minimum slot offset value based on a first field of the first downlink control information includes: if a frequency domain resource assignment manner is a frequency domain resource assignment manner type 0, and when bits in the frequency domain resource assignment field are all 0, bits in the time domain resource assignment field indicate the first minimum slot offset value; or if a frequency domain resource assignment manner is a frequency domain resource assignment manner type 1, when bits in the frequency domain resource assignment field are all 1, bits in the time domain resource assignment field indicate the first minimum slot offset value.

In another implementation, the method further includes: receiving first configuration information from the network device, where the first configuration information includes the configured frequency domain resource assignment manner.

According to an eighth aspect, a communication method is provided. The method includes: sending first downlink control information, where the first downlink control information is carried on a first physical downlink control channel PDCCH, a first field of the first downlink control information is used to determine a first minimum slot offset value, the first field includes at least one of the following fields: a frequency domain resource assignment field, a time domain resource assignment field, a modulation and coding scheme field, a new data indicator field, or a redundancy version field, and the first minimum slot offset value is used to represent a minimum available slot offset value for sending a physical downlink shared channel PDSCH or receiving a physical uplink shared channel PUSCH.

In an implementation, the first downlink control information further includes first indication information, and the first indication information is used to indicate that the first field carries indication information of the first minimum slot offset value.

In another implementation, the sending first downlink control information includes: sending the first downlink control information at a first moment, where an application moment of the first information is not earlier than a second moment; and the method further includes: sending second downlink control information at a third moment, where the third moment is between the first moment and the second moment, the second downlink control information is used to indicate a second minimum slot offset value, and an application moment of the second downlink control information is not earlier than a fourth moment; and determining a used minimum slot offset value and an application moment of the used minimum slot offset value based on the first downlink control information and/or the second downlink control information, where the used minimum slot offset value is one of the first minimum slot offset value and the second minimum slot offset value, and the application moment is not earlier than one of the second moment and the fourth moment.

In another implementation, the first field is the frequency domain resource assignment field, and that a first field of the first downlink control information is used to determine a first minimum slot offset value includes: if a frequency domain resource assignment manner is a frequency domain resource assignment manner type 0, and when bits in the frequency domain resource assignment field are all 0, bits in the time domain resource assignment field indicate the first minimum slot offset value; or if a frequency domain resource assignment manner is a frequency domain resource assignment manner type 1, when bits in the frequency domain resource assignment field are all 1, bits in the time domain resource assignment field indicate the first minimum slot offset value.

In another implementation, the method further includes: sending first configuration information, where the first configuration information includes the configured frequency domain resource assignment manner.

According to a ninth aspect, a communication method is provided. The method includes: receiving downlink control information on a first bandwidth part BWP, where the downlink control information includes a slot offset value and BWP identifier indication information; and using the slot offset value as a minimum slot offset value of a second BWP when the BWP identifier indication information indicates the second BWP. In this aspect, when the BWP is dynamically switched, a minimum slot offset value of a target BWP may be indicated, so that no new bit needs to be added, and a scheduling opportunity is not affected and a transmission latency is reduced. When the BWP is not switched, no new bit field needs to be added, a minimum slot offset value may be updated from a larger value to a smaller value, and a scheduling opportunity is not affected and a transmission latency is reduced.

In an implementation, the downlink control information is further used to indicate to receive a physical downlink shared channel PDSCH or send a physical uplink shared channel PUSCH on the second BWP at a first moment, and the first moment is a slot obtained by adding slots whose quantity is the slot offset value to a receive slot of the downlink control information.

In another implementation, the method further includes: when the BWP identifier indication information indicates the first BWP, if the slot offset value is less than a minimum slot offset value of the first BWP, receiving a PDSCH or sending a PUSCH at a second moment, where the second moment is a slot obtained by adding slots whose quantity is the minimum slot offset value of the first BWP to a receive slot of the downlink control information; and using the slot offset value as a new minimum slot offset value of the first BWP. In this implementation, if the BWP is not switched, if the slot offset value carried in the downlink control information is less than the minimum slot offset value of the first BWP, data is still transmitted based on the minimum slot offset value of the first BWP, and then the slot offset value carried in the downlink control information is used as the new minimum slot offset value of the first BWP.

In another implementation, the method further includes: when the BWP identifier indication information indicates the second BWP, if the slot offset value is less than a latency required for BWP switching, receiving a PDSCH or sending a PUSCH in a slot obtained by adding the latency required for BWP switching to a receive slot of the downlink control information. In this implementation, if the slot offset value carried in the downlink control information is less than the latency required for BWP switching, data needs to be transmitted after BWP switching is completed. In this case, the data is transmitted in the slot obtained by adding the latency required for BWP switching to the receive slot of the downlink control information, to ensure that a scheduling opportunity is not affected while the minimum slot offset value of the second BWP is indicated.

According to a tenth aspect, a communication method is provided. The method includes: sending downlink control information on a first bandwidth part BWP, where the downlink control information includes a slot offset value and BWP identifier indication information; and using the slot offset value as a minimum slot offset value of a second BWP when the BWP identifier indication information indicates the second BWP.

In an implementation, the downlink control information is further used to indicate to send a physical downlink shared channel PDSCH or receive a physical uplink shared channel PUSCH on the second BWP at a first moment, and the first moment is a slot obtained by adding slots whose quantity is the slot offset value to a receive slot of the downlink control information.

In another implementation, the method further includes: when the BWP identifier indication information indicates the first BWP, if the slot offset value is less than a minimum slot offset value of the first BWP, sending the PDSCH or receiving the PUSCH at a second moment, where the second moment is a slot obtained by adding slots whose quantity is the minimum slot offset value of the first BWP to a receive slot of the downlink control information; and using the slot offset value as a new minimum slot offset value of the first BWP.

In another implementation, the method further includes: when the BWP identifier indication information indicates the second BWP, if the slot offset value is less than a latency required for BWP switching, sending the PDSCH or receiving the PUSCH in a slot obtained by adding the latency required for BWP switching to a receive slot of the downlink control information.

According to an eleventh aspect, a communications apparatus is provided, to implement the communication method according to any one or any implementation of the first aspect, the third aspect, the fifth aspect, the seventh aspect, or the ninth aspect. For example, the communications apparatus may be a chip (such as a baseband chip or a communications chip) or a terminal device, and may implement the foregoing method by using software or hardware, or by executing corresponding software by using hardware.

In a possible implementation, a structure of the communications apparatus includes a processor and a memory. The processor is configured to support the apparatus to execute a corresponding function in the foregoing communication method. The memory is configured to be coupled to the processor, and the memory stores a program (instructions) and/or data necessary for the apparatus. Optionally, the communications apparatus may further include a communications interface, configured to support communication between the apparatus and another network element.

In another possible implementation, the communications apparatus may include a unit/module that executes a corresponding function or action in the foregoing method.

In still another possible implementation, the communications apparatus includes a processor and a transceiver apparatus. The processor is coupled to the transceiver apparatus, and the processor is configured to execute a computer program or instructions, to control the transceiver apparatus to receive and send information. When the processor executes the computer program or instructions, the processor is further configured to implement the foregoing method. For example, the transceiver apparatus may be a transceiver, a transceiver circuit, or an input/output interface. When the communications apparatus is a chip, the transceiver apparatus is a transceiver circuit or an input/output interface.

When the communications apparatus is a chip, a sending unit may be an output unit, such as an output circuit or a communications interface, and a receiving unit may be an input unit, such as an input circuit or a communications interface. When the communications apparatus is a network device, a sending unit may be a transmitter or a transmitter device, and a receiving unit may be a receiver or a receiver device.

According to a twelfth aspect, a communications apparatus is provided, to implement the communication method according to any one or any implementation of the second aspect, the fourth aspect, the sixth aspect, the eighth aspect, or the tenth aspect. For example, the communications apparatus may be a chip (such as a baseband chip or a communications chip) or a network device, and may implement the foregoing method by using software or hardware, or by executing corresponding software by using hardware.

In a possible implementation, a structure of the communications apparatus includes a processor and a memory. The processor is configured to support the apparatus to execute a corresponding function in the foregoing communication method. The memory is configured to be coupled to the processor, and the memory stores a program (instructions) and data necessary for the apparatus. Optionally, the communications apparatus may further include a communications interface, configured to support communication between the apparatus and another network element.

In another possible implementation, the communications apparatus may include a unit/module that executes a corresponding action in the foregoing method.

In another possible implementation, the communications apparatus includes a processor and a transceiver apparatus. The processor is coupled to the transceiver apparatus, and the processor is configured to execute a computer program or instructions, to control the transceiver apparatus to receive and send information. When the processor executes the computer program or instructions, the processor is further configured to implement the foregoing method. For example, the transceiver apparatus may be a transceiver, a transceiver circuit, or an input/output interface. When the communications apparatus is a chip, the transceiver apparatus is a transceiver circuit or an input/output interface.

When the communications apparatus is a chip, a receiving unit may be an input unit, such as an input circuit or a communications interface, and a sending unit may be an output unit, such as an output circuit or a communications interface. When the communications apparatus is a terminal device, a receiving unit may be a receiver (may also be referred to as a receiver device), and a sending unit may be a transmitter (may also be referred to as a transmitter device).

It may be understood that, in the embodiments of this application, hardware parts responsible for input and output in the communications apparatus may be integrated together.

According to a thirteenth aspect, a computer-readable storage medium is provided. The computer-readable storage medium stores instructions, and when the instructions are run on a computer, the computer is enabled to execute the methods according to the foregoing aspects.

According to a fourteenth aspect, a computer program product that includes instructions is provided. When the computer program product runs on a computer, the computer is enabled to execute the methods according to the foregoing aspects.

According to a fifteenth aspect, a communications system is provided, including any one of the foregoing network device-side communications apparatuses and/or any one of the foregoing terminal device-side communications apparatuses.

BRIEF DESCRIPTION OF DRAWINGS

The following describes the accompanying drawings required for describing the embodiments or the background of this application.

DESCRIPTION OF EMBODIMENTS

The following describes the embodiments of this application with reference to the accompanying drawings in the embodiments of this application.

Figure 1:
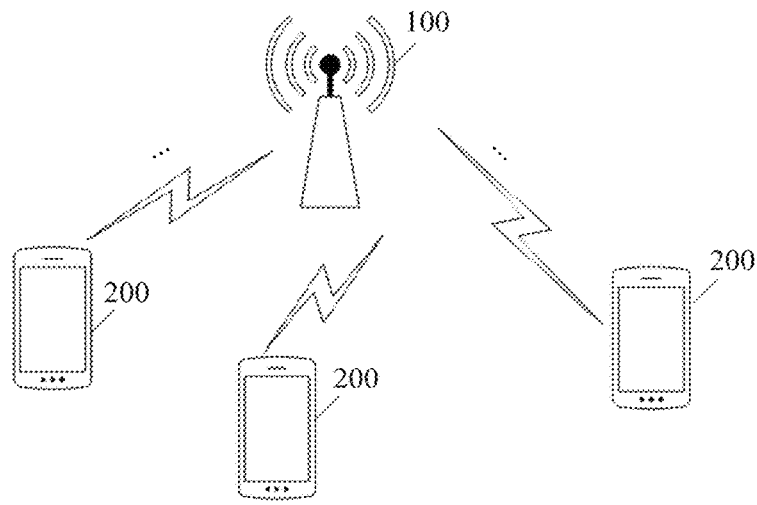
FIG. 1 is a schematic diagram of a communications system according to this application.

FIG. 1 is a schematic diagram of a communications system according to this application. The communications system may include at least one network device 100 (only one network device is shown) and one or more terminal devices 200 connected to the network device 100.

The network device 100 may be a device that can communicate with the terminal device 200. The network device 100 may be any device with a wireless sending/receiving function, and includes but is not limited to a NodeB NodeB, an evolved NodeB eNodeB, a base station in a 5th generation (the fifth generation, 5G) communications system, a base station or a network device in a future communications system, an access node in a WiFi system, a wireless relay node, a wireless backhaul node, and the like. The network device 100 may be alternatively a radio controller in a cloud radio access network (cloud radio access network, CRAN) scenario. The network device 100 may be alternatively a small cell, a transmission node (transmission reference point, TRP), or the like. A specific technology and a specific device form used by the network device are not limited in this embodiment of this application.

The terminal device 200 is a device with a wireless sending/receiving function, and may be deployed on the land and includes an indoor or outdoor device, a hand-held device, a wearable device, or a vehicle-mounted device, or may be deployed on the water, such as a ship, or may be deployed in the air, such as an airplane, a balloon, and a satellite. The terminal device may be a mobile phone (mobile phone), a tablet computer (pad), a computer with a wireless sending/receiving function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in this embodiment of this application. The terminal device sometimes may also be referred to as user equipment (user equipment, UE), an access terminal device, a UE unit, a mobile station, a remote station, a remote terminal device, a mobile device, a terminal (terminal), a wireless communications device, a UE agent, a UE apparatus, or the like.

It should be noted that, in the embodiments of this application, the terms "system" and "network" may be used interchangeably. The term "a plurality of" means two or more, and therefore "a plurality of" may also be understood as "at least two" in the embodiments of this application. The term "and/or" indicates an association relationship for describing associated objects and represents that three relationships may exist. For example, A and/or B may represent the following three cases: Only A exists, both A and B exist, and only B exists.

Figure 2:
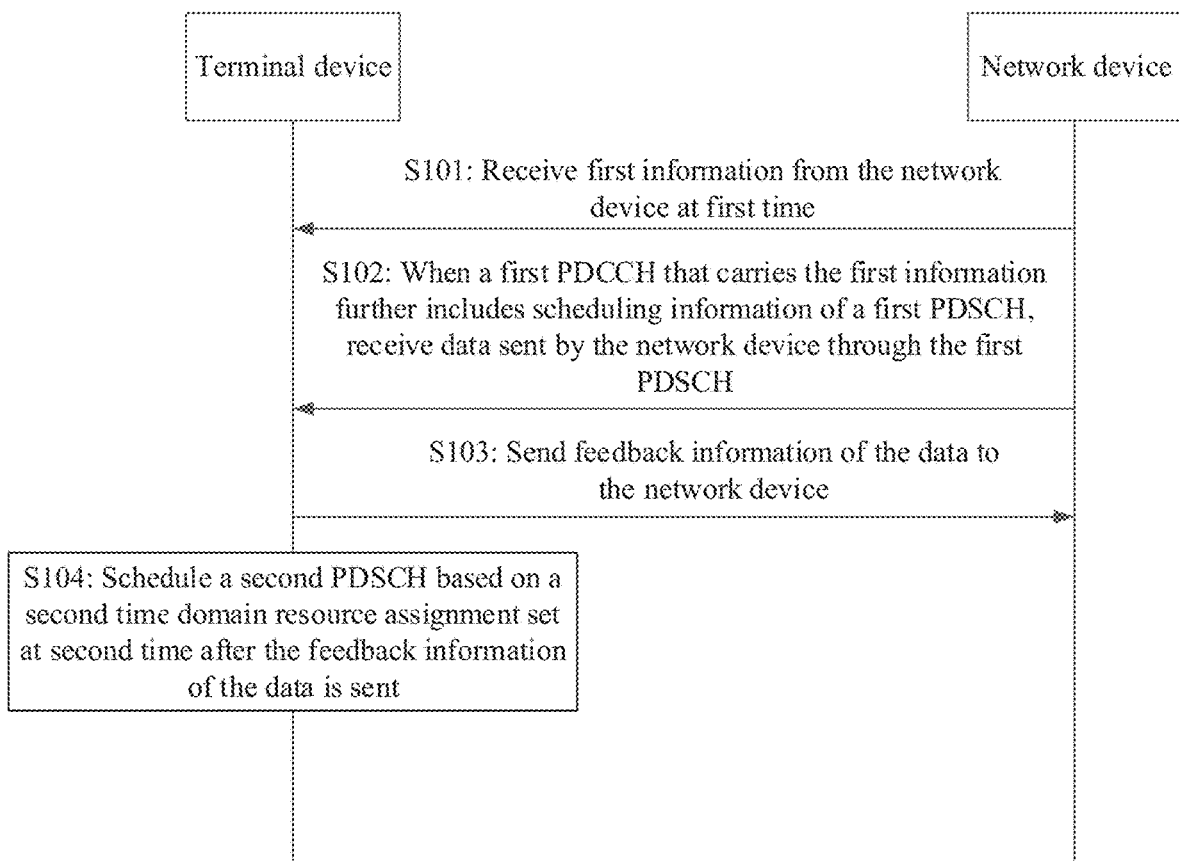
FIG. 2 is a schematic flowchart of a communication method according to an embodiment of this application.

FIG. 2 is a schematic flowchart of a communication method according to an embodiment of this application. The method includes the following steps.

S101: A network device sends first information to a terminal device at first time.

Correspondingly, the terminal device receives the first information.

The first information is carried on a first PDCCH. For example, the first information is downlink control information (downlink control information, DCI). A first PDSCH is scheduled through the first PDCCH based on a first time domain resource assignment set at the first time.

Figure 3:
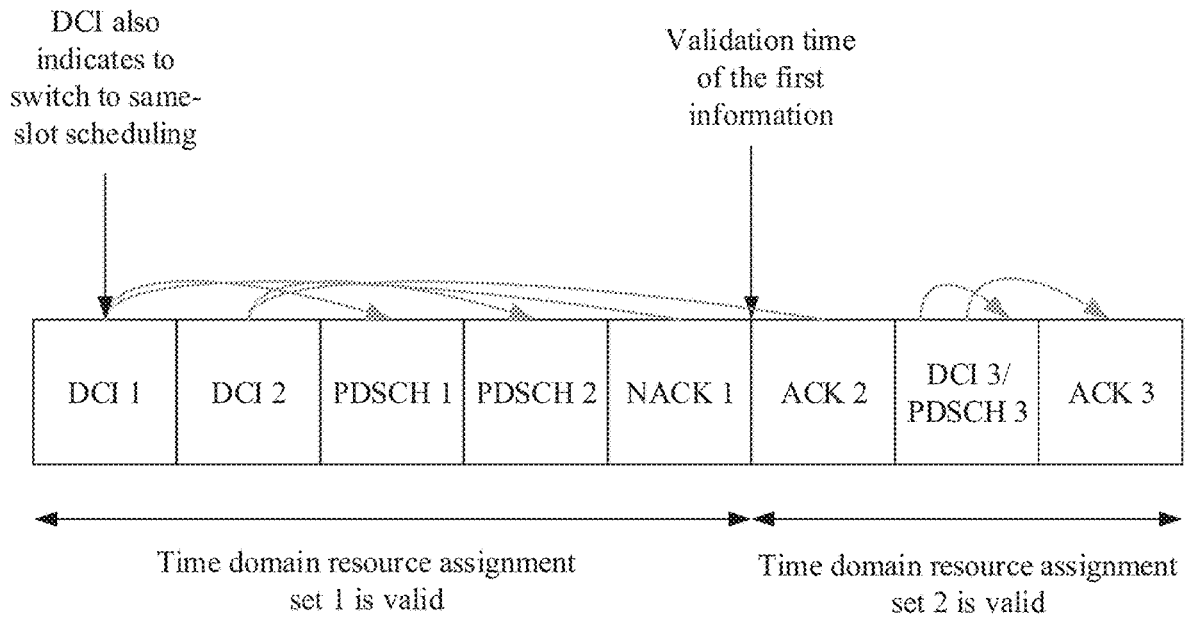
FIG. 3 is an example schematic diagram of switching a time domain resource assignment set.

FIG. 3 is an example schematic diagram of switching a time domain resource assignment set. At the first time, DCI 1 is the first information. The DCI 1 is carried on the first PDCCH. Scheduling is performed through the first PDCCH at the first time by using a time domain resource assignment set 1, in other words, a time domain resource assignment set that is valid at the first time is the time domain resource assignment set 1. The DCI 1 carries scheduling information of a PDSCH 1, including a slot offset of the PDSCH 1, and the slot offset of the PDSCH 1 is a value in the time domain resource assignment set 1. For example, slot offset values in the time domain resource assignment set 1 are all greater than 0, in other words, cross-slot scheduling is performed through the first PDCCH.

In this embodiment, the first information is used to determine a second time domain resource assignment set for scheduling a second PDSCH after the first time. In other words, the first information is used to indicate that a value range of a slot offset for scheduling the second PDSCH through a second PDCCH changes after the first time. For example, the slot offset includes 0 after the first time. As shown in FIG. 3, the PDSCH 1 is scheduled by using the DCI 1, and the DCI 1 also indicates that same-slot scheduling can be performed on a PDSCH through a PDCCH after the first time. In other words, the first time domain resource assignment set includes slot offset values greater than or equal to 0. In this embodiment, the first information is used to determine that the value range of the PDSCH slot offset for scheduling the PDSCH through the second PDCCH changes after the first time. A specific indication manner is not limited. The first information may be an explicit indication, or may be an implicit indication. The first information may indicate a minimum value of the slot offset, or may indicate an index value corresponding to a minimum value of the slot offset. In the present invention, the time domain resource assignment set may also be represented as a minimum value of a slot offset.

S102: When the first PDCCH that carries the first information further includes scheduling information of the first PDSCH, the network device sends data to the terminal device through the first PDSCH.

Correspondingly, the terminal device receives the data.

In this embodiment, the first PDCCH that carries the first information further includes the scheduling information of the first PDSCH, and therefore the network device sends the data to the terminal device through the first PDSCH based on the scheduling information.

As shown in FIG. 3, at the first time, the first PDCCH that carries the DCI 1 is further used to schedule the PDSCH 1, and therefore the network device sends data to the terminal device through the PDSCH 1. In addition, a PDSCH 2 is still scheduled based on the time domain resource assignment set 1 by using DCI 2, and therefore the network device sends data to the terminal device through the PDSCH 2.

S103: The terminal device sends feedback information of the data to the network device.

Correspondingly, the network device receives the feedback information of the data.

After receiving the data sent by the network device through the first PDSCH, the terminal device needs to send the feedback information to the network device. The feedback information includes an acknowledgement (acknowledgement, ACK) and a negative acknowledgement (negative acknowledgement, NACK), and indicates whether the terminal device correctly receives the data sent through the PDSCH.

As shown in FIG. 3, for the data sent by the network device on the PDSCH 1, the terminal device sends a NACK 1 to the network device. For the data sent by the network device on the PDSCH 2, the terminal device sends an ACK 2 to the network device.

S104: Schedule the second PDSCH based on the second time domain resource assignment set at second time after the feedback information of the data sent through the first PDSCH is sent, where the second time is later than the first time.

In this embodiment, regardless of whether the feedback message corresponding to the first PDSCH is an ACK or a NACK, after the network device receives the feedback information that corresponds to the first PDSCH and that is sent by the terminal device, in other words, at second time after the terminal device sends the feedback information of the data of the first PDSCH, the second PDSCH is scheduled through the second PDCCH based on the second time domain resource assignment set. It should be noted that there may be one or more second PDSCHs, and the second PDSCH means all PDSCHs scheduled at the second time. Because the network device receives the feedback information sent by the terminal device, the network device can determine that the terminal device receives the first information, in other words, the terminal device does not miss detecting the PDCCH that carries the first information, and the first information is used to determine the second time domain resource assignment set for scheduling the second PDSCH through the second PDCCH after the first time. Therefore, the terminal device and the network device may simultaneously validate the second time domain resource assignment set as a PDSCH time domain resource assignment set after exchanging the feedback information of the data of the first PDSCH.

As shown in FIG. 3, after the terminal device sends the NACK 1, scheduling may be performed through the second PDCCH by using a time domain resource assignment set 2, in other words, after the NACK 1 is sent, a valid time domain resource assignment set is the time domain resource assignment set 2, in other words, scheduling the PDSCH through the second PDCCH includes same-slot scheduling. For example, same-slot scheduling is performed on a PDSCH 3 by using DCI 3.

In addition, the first PDCCH that carries the first information may not include the scheduling information of the first PDSCH. Therefore, in another embodiment, S102 and S103 may be replaced with that the terminal device sends feedback information of the first PDCCH to the network device, to indicate that the terminal device receives the first information.

S104 may be replaced with scheduling the second PDSCH based on the second time domain resource assignment set at third time after the feedback information of the first PDCCH is sent.

In this replaced embodiment, if the first PDCCH that carries the first information does not include the scheduling information of the first PDSCH, to prevent missing detection of the first information, the terminal device may send the feedback information of the first PDCCH to the network device, and schedule the second PDSCH based on the second time domain resource assignment set at the third time after the feedback information of the first PDCCH is sent. For an implementation process thereof, refer to the foregoing embodiment.

Figure 4:
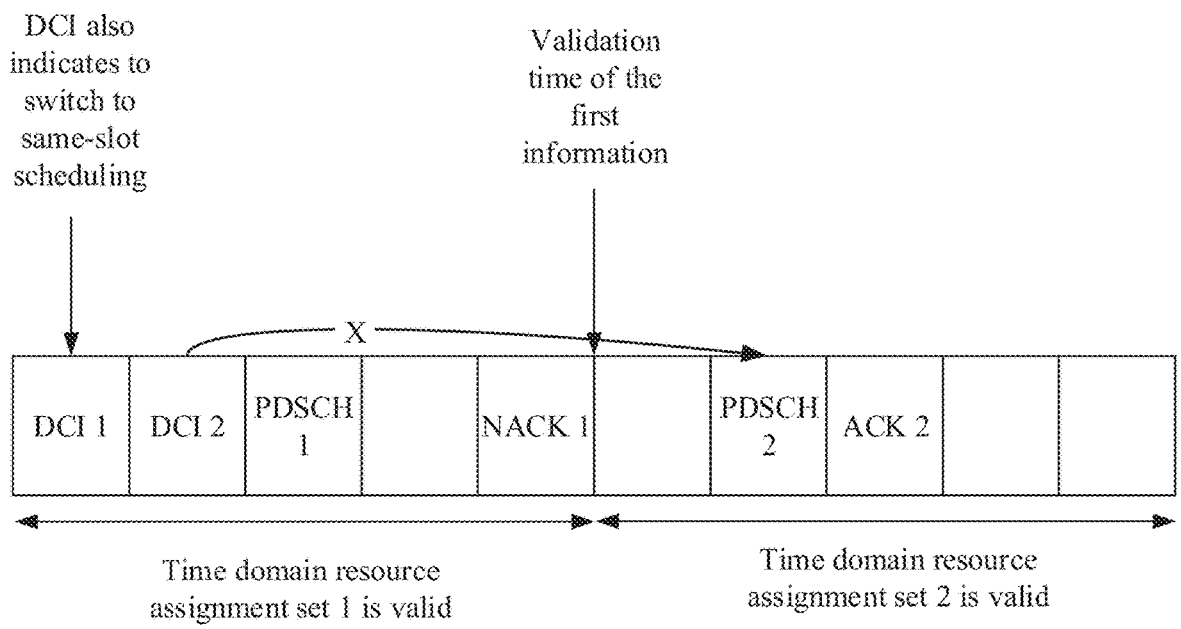
FIG. 4 is another example schematic diagram of switching a time domain resource assignment set.

In addition, after the network device indicates, by using the DCI, to switch the time domain resource assignment set, and before the first information is validated, in other words, before the terminal device completes sending of the feedback message, the network device still performs scheduling by using the current time domain resource assignment set, for example, cross-slot scheduling indicated by the set 1 in FIG. 3. However, in this time period (in other words, after signaling switching is indicated, and before signaling is validated), a PDSCH scheduled through a PDCCH cannot be transmitted after validation time of the first information, in other words, the PDSCH scheduled through the PDCCH cannot be transmitted after the feedback message of the first PDSCH or the feedback message of the first PDCCH. For example, as shown in FIG. 4, scheduling performed by using DCI 2 still meets a set 1, but a scheduled PDSCH 2 is transmitted after the validation time. This case is unexpected. Instead, it should be that, as shown in FIG. 3, scheduling performed by using the DCI 2 still meets the set 1, and the scheduled PDSCH 2 is transmitted before the validation time. In this way, the network device and the terminal device can truly perform same-slot scheduling immediately after the signaling is validated.

Figure 5:
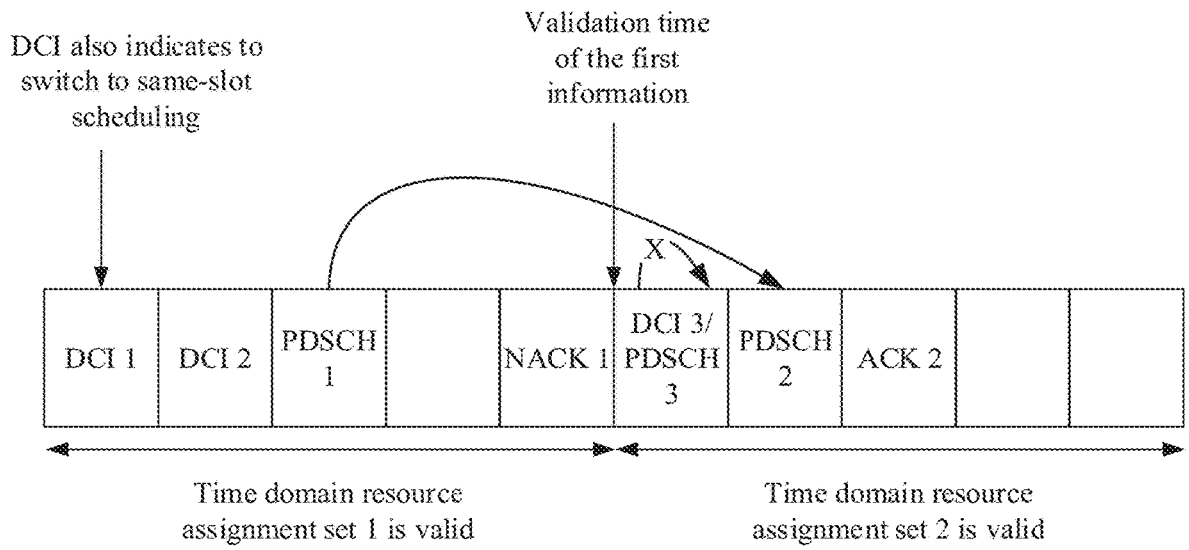
FIG. 5 is another example schematic diagram of switching a time domain resource assignment set.

The reason for the foregoing constraint is that a current protocol does not support scheduling disorder, in other words, for two HARQ processes, if an end symbol location of DCI 3 is not earlier than an end symbol location of DCI 2, but a start symbol location of a PDSCH 3 is earlier than an end symbol location of a PDSCH 2, this scheduling is not supported. Therefore, if the scheduling a PDSCH through a PDCCH in the time period after indication of the first information and before invalidation of the first information is not limited, a PDSCH cannot be transmitted after the validation time of the first information, and a case, in FIG. 5, in which a PDSCH 2 is scheduled by using DCI 2 occurs. In this case, even if switched signaling is validated, a PDSCH 3 cannot be scheduled by using DCI 3 in a same slot.

It should be noted that, in this embodiment, if the terminal device is being in cross-slot scheduling, in other words, slot offset values in a time domain resource assignment set are all greater than 0, once the terminal device sends a scheduling request (scheduling request, SR) to the network device, the terminal device falls back to a default configuration of a PDSCH time domain resource assignment set, in other words, slot offset values can include 0, and same-slot scheduling can be performed. After the network device receives the SR sent by the terminal device, the network device also falls back to the default time domain resource assignment set, in other words, the slot offsets include 0, and same-slot scheduling can be performed.

According to the communication method provided in this embodiment of this application, during data scheduling, time domain resource assignment sets used at different time may be explicitly indicated based on an actual requirement, balancing power consumption and a transmission latency of the terminal device. In addition, this avoids that the base station and the terminal device are inconsistent in behavior due to missing detection of the terminal device is avoided, and ensures reliability of dynamically switching a time domain resource assignment set.

Figure 6:
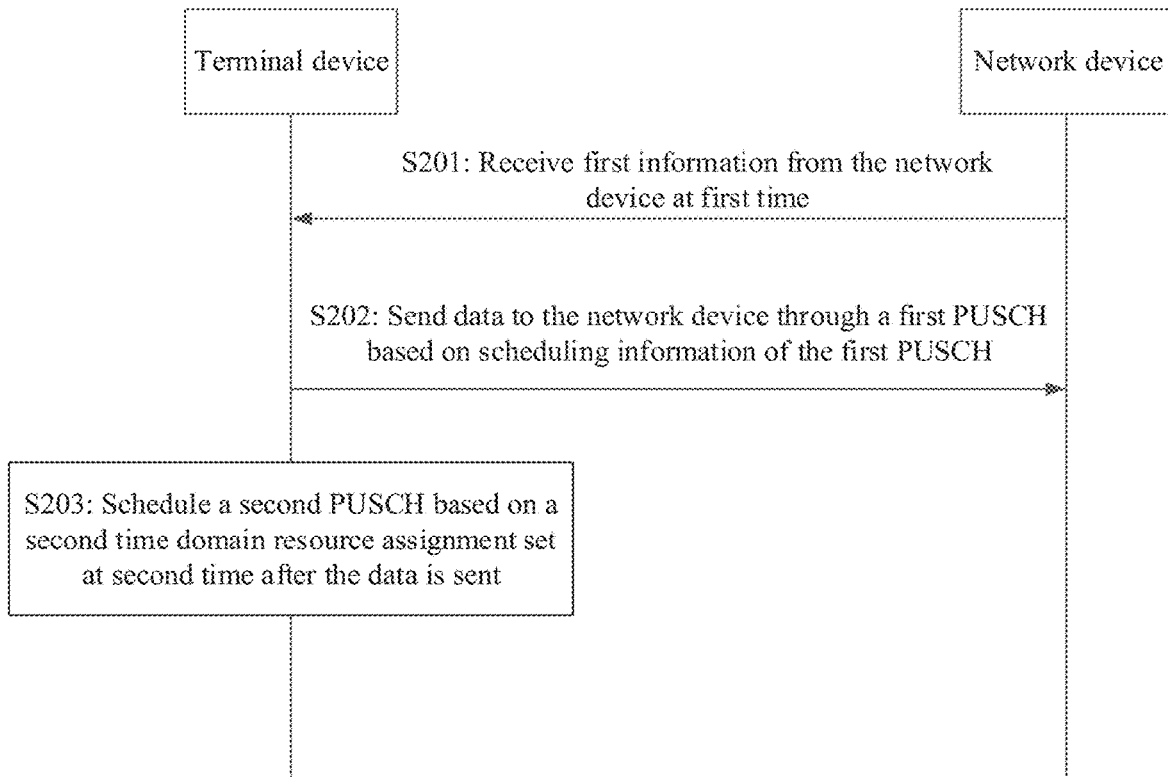
FIG. 6 is a schematic flowchart of another communication method according to an embodiment of this application.

FIG. 6 is a schematic flowchart of another communication method according to an embodiment of this application. The method includes the following steps.

S201: A network device sends first information to a terminal device at first time.

Correspondingly, the terminal device receives the first information.

The first information is carried on a first PDCCH, the first PDCCH that carries the first information further includes scheduling information of a first PUSCH, the first PUSCH is scheduled based on a first time domain resource assignment set at the first time, and the first information is used to determine a second time domain resource assignment set for scheduling a second PUSCH after the first time.

S202: The terminal device sends data to the network device through the first PUSCH based on the scheduling information of the first PUSCH. A slot offset of the first PUSCH is a value in the first time domain resource assignment set.

Correspondingly, the network device receives the data.

S203: Schedule the second PUSCH based on the second time domain resource assignment set at second time after the data of the first PUSCH is sent, where the second time is later than the first time.

Different from the embodiment shown in FIG. 2, the first information is used to determine a time domain resource assignment set for uplink scheduling. For uplink scheduling, due to no HARQ-ACK feedback, after the terminal device sends a PUSCH to the network device, the network device does not send HARQ-ACK information to the terminal device. Therefore, the first PUSCH is scheduled through the first PDCCH based on the first time domain resource assignment set at the first time, and the terminal device may schedule the second PUSCH based on the second time domain resource assignment set at the second time after the data is sent through the first PUSCH.

The first time domain resource assignment set is a set different from the second time domain resource assignment set. For example, the first PUSCH is scheduled through the first PDCCH based on the first time domain resource assignment set at the first time, and slot offset values in the first time domain resource assignment set are greater than or equal to 0, in other words, same-slot scheduling can be performed; and at the second time, slot offset values in the second time domain resource assignment set are all greater than 0, in other words, cross-slot scheduling can be performed, and same-slot scheduling cannot be performed. Alternatively, on the contrary, scheduling is performed through the first PDCCH based on the first time domain resource assignment set at the first time, and slot offset values in the first time domain resource assignment set are greater than 0, in other words, cross-slot scheduling can be performed, and same-slot scheduling cannot be performed; and at the second time, slot offset values in the second time domain resource assignment set are greater than or equal to 0, in other words, same-slot scheduling can be performed. Alternatively, the first time domain resource assignment set may be a subset of the second time domain resource assignment set, or the second time domain resource assignment set may be a subset of the first time domain resource assignment set.

In this embodiment, the first information is used to determine that a value range of a slot offset for scheduling the second PUSCH changes after the first time. A specific indication manner is not limited. The first information may be an explicit indication, or may be an implicit indication. The first information may indicate a minimum value of the slot offset, or may indicate an index value corresponding to a minimum value of the slot offset. In the present invention, the time domain resource assignment set may also be represented as a minimum value of a slot offset.

Figure 7:
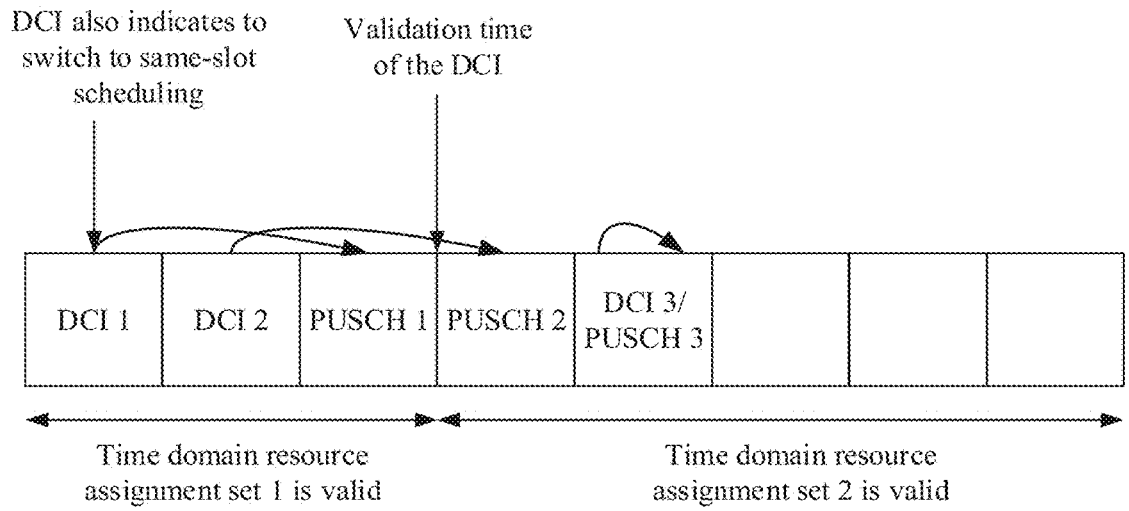
FIG. 7 is another example schematic diagram of switching a time domain resource assignment set.

FIG. 7 is another example schematic diagram of switching a time domain resource assignment set. Scheduling is performed, for example, a PUSCH 1 is scheduled, based on a time domain resource assignment set 1 at the first time through the first PDCCH that carries DCI 1, and a slot offset of the PUSCH 1 is a value in the time domain resource assignment set 1, in other words, a valid time domain resource assignment set is the time domain resource assignment set 1. In this embodiment, a time domain offset value K in the time domain resource assignment set 1 is greater than 0. For example, at the first time, cross-slot scheduling is performed on the PUSCH 1 by using the DCI 1, and cross-slot scheduling is performed on a PUSCH 2 by using DCI 2. The DCI 1 indicates to use a resource assignment set 2 at the second time, in other words, indicates to switch to same-slot scheduling at the second time. The indication is validated after the terminal device sends the PUSCH 1. Therefore, a PUSCH is scheduled based on the time domain resource assignment set 2 at the second time. For example, a PUSCH 3 is scheduled based on the time domain resource assignment set 2 through a PDCCH that carries DCI 3. In other words, the time domain resource assignment set 2 is valid. In this example, a time domain offset value K in the time domain resource assignment set 2 is greater than or equal to 0. For example, same-slot scheduling may be performed on the PUSCH 3 by using the DCI 3. The second time is later than the first time.

It should be noted that, in this embodiment, if the terminal device is being in cross-slot scheduling, in other words, slot offset values in a time domain resource assignment set are all greater than 0, once the terminal device sends a scheduling request to the network device, the terminal device falls back to a default configuration of a PDSCH time domain resource assignment set. In other words, slot offset values can include 0, and same-slot scheduling can be performed. After the network device receives the SR sent by the terminal device, the network device also falls back to the default time domain resource assignment set, in other words, the slot offsets include 0, and same-slot scheduling can be performed.

According to the communication method provided in this embodiment of this application, during data scheduling, time domain resource assignment sets used at different time may be explicitly indicated based on an actual requirement, balancing power consumption and a transmission latency of the terminal device. In addition, this avoids that the base station and the terminal device are inconsistent in behavior due to missing detection of the terminal device is avoided, and ensures reliability of dynamically switching a time domain resource assignment set.

Figure 8:
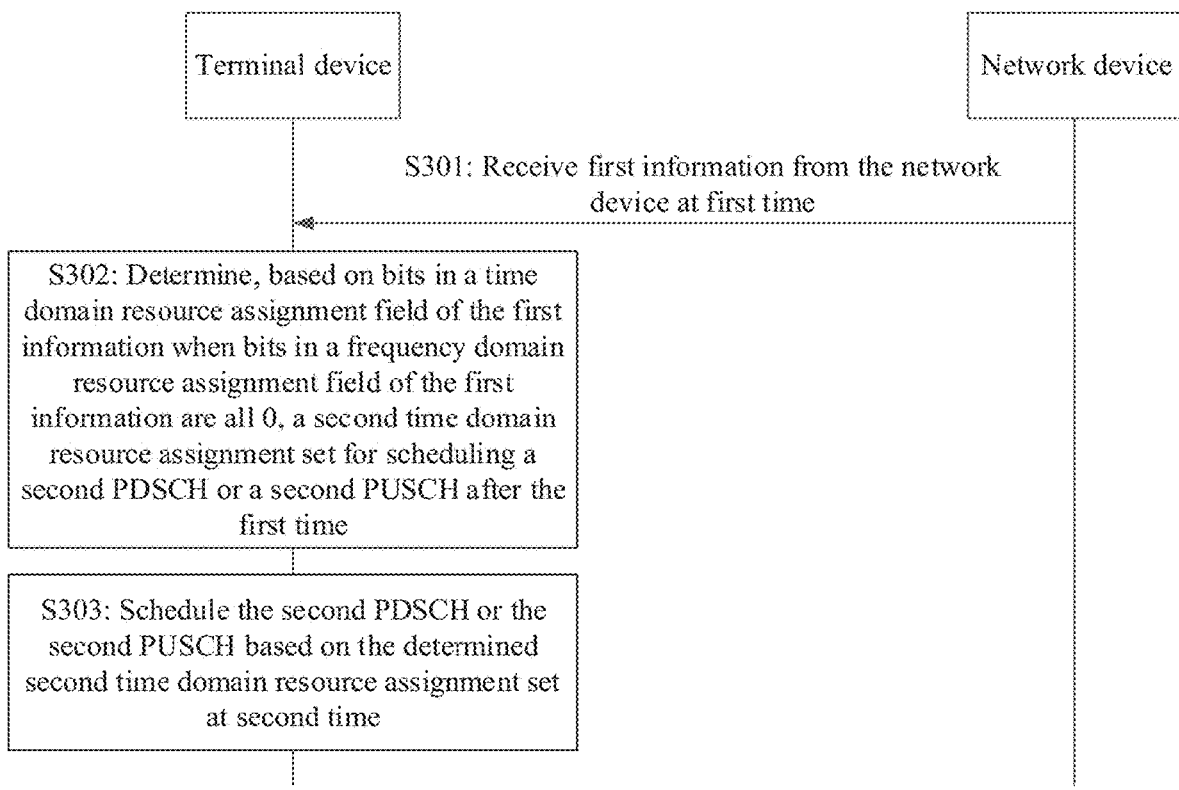
FIG. 8 is a schematic flowchart of another communication method according to an embodiment of this application.

FIG. 8 is a schematic flowchart of another communication method according to an embodiment of this application. The method includes the following steps.

S301: A network device sends first information to a terminal device at first time.

Correspondingly, the terminal device receives the first information.

The first information is carried on a first PDCCH. A first PDSCH is scheduled through the first PDCCH based on a first time domain resource assignment set at the first time. For example, the first information is DCI. The DCI is in an existing UE-specific DCI format (DCI format).

S302: Determine, based on bits in a time domain resource assignment (time domain resource assignment) field of the first PDCCH when bits in a frequency domain resource assignment (frequency domain resource assignment) field of the first PDCCH are all 0, a second time domain resource assignment set for scheduling a second PDSCH or a second PUSCH after the first time.

The terminal device parses the DCI in the PDCCH to obtain the bits in the frequency domain resource assignment field and the bits in the time domain resource assignment field. When the DCI is used to schedule a PDSCH or a PUSCH, the bits in the frequency domain resource assignment field of the DCI are not all 0, in other words, the PDSCH or PUSCH needs to occupy a specific frequency domain resource, and the terminal device may consider that the first information is normal scheduling information. Therefore, the bits in the time domain resource assignment field represent a time domain location of the currently scheduled PDSCH or PUSCH.

When the bits in the frequency domain resource assignment field of the first information are all 0, it may be considered that the first information is not scheduling information of a current PDSCH or PUSCH. Therefore, the bits in the time domain resource assignment field represent the second time domain resource assignment set.

Alternatively, the first time domain resource assignment set may be a subset of the second time domain resource assignment set, or the second time domain resource assignment set may be a subset of the first time domain resource assignment set.

Specifically, the bits in the time domain resource assignment field represent a minimum slot offset value or an index of a minimum slot offset value in the second time domain resource assignment set. Therefore, S302 includes: determining a minimum slot offset value or an index of a minimum slot offset value of the second PDSCH or the second PUSCH based on the bits in the time domain resource assignment field of the first PDCCH when the bits in the frequency domain resource assignment field of the first PDCCH are all 0. For example, when the bits in the time domain resource assignment field indicate that the minimum slot offset value is 0, it may be determined that slot offset values in the second time domain resource assignment set are greater than or equal to 0, or when the bits in the time domain resource assignment field indicates that the minimum slot offset value is a value greater than 0, it may be determined that slot offset values in the second time domain resource assignment set are greater than 0.

A type 0 is used as an example for frequency domain resource assignment. Resource block groups (resource block group, RBG)(one RBG may include a plurality of RBs) assigned to a terminal device are indicated by using a bitmap (bitmap). If an RBG is assigned to a terminal device, a corresponding bit in the bitmap is set to 1; otherwise, set to 0.

Figure 9A:
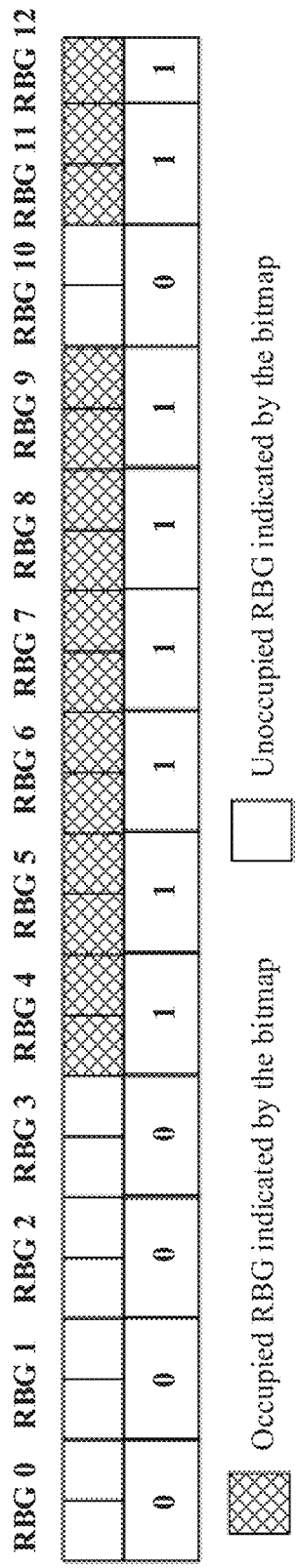
FIG. 9a is a schematic diagram of indicating a frequency domain resource of a PDSCH or PUSCH by using bits in a frequency domain resource assignment field of DCI.

For example, RBGSize=2, and there are 13 RBGs in total. If a corresponding BitMap field is 0000111111011B (binary), occupied RBGs are shown in FIG. 9a. FIG. 9a is a schematic diagram of indicating a frequency domain resource of a PDSCH or PUSCH by using bits in a frequency domain resource assignment field of DCI. If the DCI is used to schedule a PDSCH/PUSCH, at least one RB needs to be indicated in frequency domain, and there is at least one non-0 bit in a bitmap. On the contrary, if the terminal device detects that a frequency domain resource assignment bitmap of the DCI is all 0, in other words, 0000000000000, the terminal device considers that the DCI is used to determine the second time domain resource assignment set for scheduling the second PDSCH or the second PUSCH after the first time, and the corresponding time domain resource assignment field is understood as the minimum slot offset or the index corresponding to the minimum slot offset.

S303: Schedule the second PDSCH or the second PUSCH based on the determined second time domain resource assignment set at second time, where the second time is later than the first time.

At the second time, scheduling is performed through a second PDCCH based on the determined second time domain resource assignment set. The second time domain resource assignment set may be a set different from the first time domain resource assignment set. For example, scheduling is performed based on the first time domain resource assignment set at the first time, and slot offset values in the first time domain resource assignment set are greater than or equal to 0, in other words, same-slot scheduling can be performed; and at the second time, slot offset values in the second time domain resource assignment set are greater than 0, in other words, cross-slot scheduling can be performed. Alternatively, on the contrary, scheduling is performed through the first PDCCH based on the first time domain resource assignment set at the first time, and slot offset values in the first time domain resource assignment set are greater than 0, in other words, cross-slot scheduling can be performed; and at the second time, slot offset values in the second time domain resource assignment set are greater than or equal to 0, in other words, same-slot scheduling can be performed.

In this embodiment, the first information is used to determine that a value range of a slot offset for scheduling the second PDSCH changes after the first time. A specific indication manner is not limited. The first information may be an explicit indication, or may be an implicit indication. The first information may indicate a minimum value of the slot offset, or may indicate an index value corresponding to a minimum value of the slot offset. In the present invention, the time domain resource assignment set may also be represented as a minimum value of a slot offset.

According to the communication method provided in this embodiment of this application, when the first information is not used for scheduling, the time domain resource assignment set may be indicated by using the bits in the time domain resource assignment field of the first information, so that time domain resource assignment sets used at different time may be explicitly indicated based on an actual requirement, balancing power consumption and a transmission latency of the terminal device. In addition, this avoids that the network device and the terminal device are inconsistent in behavior due to missing detection of the terminal device, and ensures reliability of dynamically switching a time domain resource assignment set.

A first field of the downlink control information is usually used for data scheduling. In this application, the first field of the downlink control information may be reused to determine a minimum slot offset value.

Figure 10:
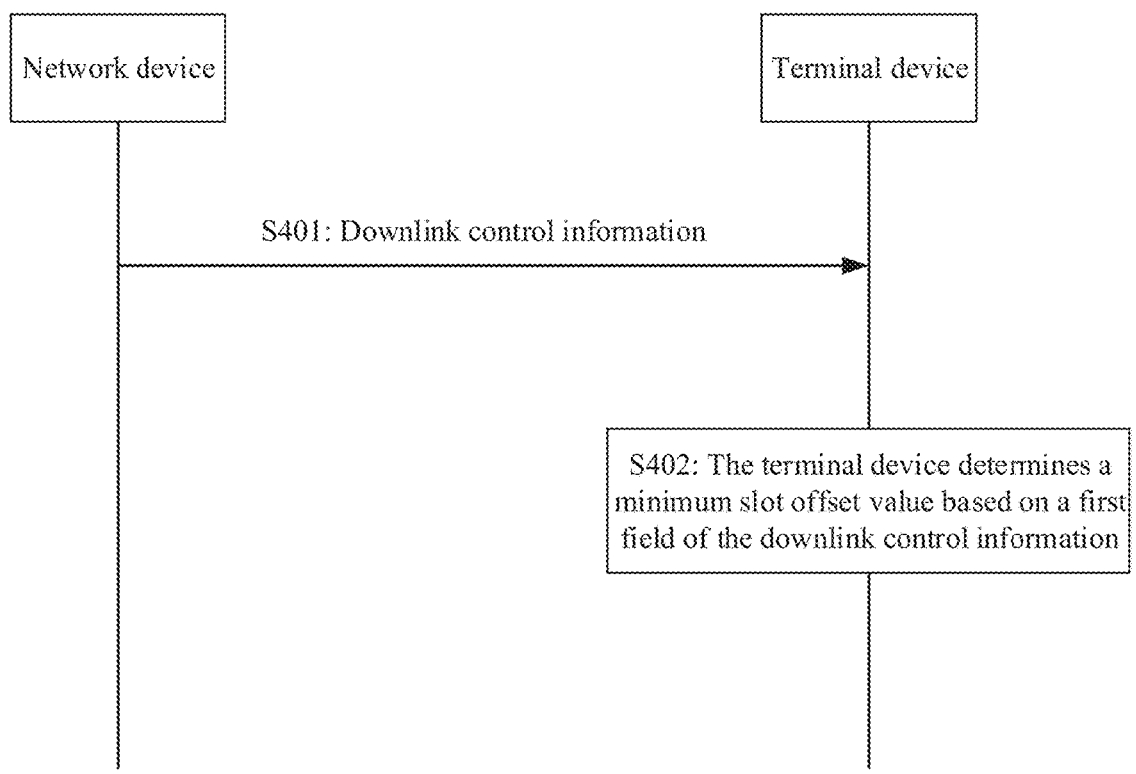
FIG. 10 is a schematic flowchart of another communication method according to an embodiment of this application.

FIG. 10 is a schematic flowchart of another communication method according to an embodiment of this application. For example, the method may include the following steps.

S401: A network device sends downlink control information to a terminal device.

Correspondingly, the terminal device receives the downlink control information.

The downlink control information is carried on a PDCCH.

S402. The terminal device determines a minimum slot offset value based on a first field of the downlink control information.

The downlink control information has the corresponding first field. If the downlink control information is used for data scheduling, the first field may be referred to as an uplink grant field (for PUSCH scheduling) or a downlink assignment field (for PDSCH scheduling). In this application, the downlink control information is not used for data scheduling. Instead, the first field is reused to determine the minimum slot offset value. The minimum slot offset value may also be referred to as a minimum value of a slot offset. The minimum slot offset value represents a minimum available slot offset value (minimum K0) for receiving a PDSCH or a minimum available slot offset value (minimum K2) for sending a PUSCH. In other words, during actual scheduling, the network device schedules a PDSCH or PUSCH by using the minimum slot offset. When the network device schedules the PDSCH or PUSCH, a slot offset value of the PDSCH or PUSCH is greater than or equal to the minimum slot offset value, and a slot offset value for receiving the PDSCH or sending the PUSCH by the terminal device is greater than or equal to the minimum slot offset value. The minimum slot offset value may alternatively represent a minimum available slot offset value for receiving an aperiodic CSI-RS, a minimum available slot offset value for receiving an aperiodic SRS, or a minimum available slot offset value for receiving HARQ-ACK feedback corresponding to a PDSCH.

The first field includes at least one of the following fields: a frequency domain resource assignment field, a time domain resource assignment field, a modulation and coding scheme (modulation and coding scheme, MCS) field, a new data indicator (new data indicator, NDI) field, or a redundancy version (redundancy version, RV) field.

Optionally, the downlink control information further includes first indication information, and the first indication information is used to indicate that the first field carries indication information of the minimum slot offset value. In other words, it may be explicitly indicated that the first field of the downlink control information is used to determine the minimum slot offset value, instead of being used for data scheduling. For example, the first indication information is a 1-bit value. When the first indication information is in a first state, it indicates that the first field is used to determine the minimum slot offset value; or when the first indication information is in a second state, it indicates that the first field is used for data scheduling.

Certainly, it may be alternatively implicitly indicated that the first field of the downlink control information is used to determine the minimum slot offset value, instead of being used for data scheduling. For example, if the first field of the downlink control information is a set value, it may be determined that the first field of the downlink control information is used to determine the minimum slot offset value.

Specifically, in an implementation, S402 includes: obtaining a value of the time domain resource assignment field when one or more fields in the first field of the downlink control information are first set values, where the value of the time domain resource assignment field is used to indicate the minimum slot offset value. In this implementation, the time domain resource assignment field may have different values, and different values correspond to different minimum slot offset values. For example, when a value of the frequency domain resource assignment field is a preconfigured or predefined specific value, the value of the time domain resource assignment field represents minimum K0 or minimum K2. For different frequency domain resource assignment manners, the frequency domain resource assignment field has different specific values. Specifically, there may be the following several cases:

(a) A network side device configures only a frequency domain resource assignment manner type 0 (type 0) by using RRC signaling, and indicates, by using a bitmap (bitmap), resource block groups (resource block group, RBG) (one RBG may include a plurality of RBs) assigned to a terminal device, where each bit corresponds to one RBG. If an RBG is assigned to a terminal device, a corresponding bit in the bitmap is set to 1; otherwise, set to 0. As shown in FIG. 9a, an RBG 4 to an RBG 9, an RBG 11, and an RBG 12 are assigned to a terminal device, corresponding bits thereof are set to 1, and remaining bits are set to 0. A quantity of bits in a frequency domain resource assignment field of the type 0 is $N_{RBG}$, and $N_{RBG}$ is equal to a quantity of RBGs of an activated uplink BWP or an activated downlink BWP. As shown in FIG. 9a, $N_{RBG}=13$. When $N_{RBG}$ bits are all 0, bits in a time domain resource assignment field indicate minimum K0 or minimum K2. For example, $N_{RBG}=13$, and the bitmap is equal to 0000000000000.

Figure 9B:
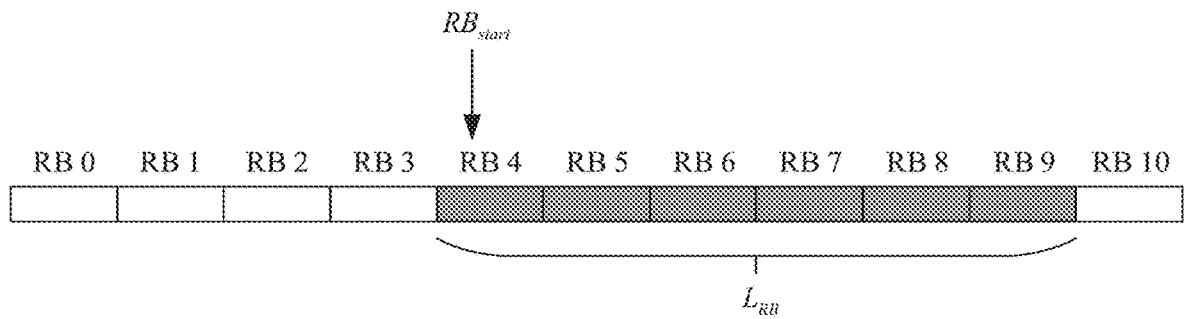
FIG. 9b is a schematic diagram of indicating a frequency domain resource of a PDSCH or PUSCH by using an RIV.

(b) A network side device configures only a frequency domain resource assignment manner type 1 (type 1) by using RRC signaling, and assigns consecutive resource blocks (resource block, RB) to a terminal device, where the resource assignment is performed in a unit of RB. A resource block start location $RB_{start}$, and a quantity $L_{RB}$ of consecutively assigned RBs are indicated by using a resource indicator value (resource indication value, RIV). FIG. 9b is a schematic diagram of indicating a frequency domain resource of a PDSCH or PUSCH by using an RIV. A quantity of bits in a frequency domain resource assignment field of the type 1 is $\lceil \log_2(N_{RB}^{BWP}(N_{RB}^{BWP}+1)/2) \rceil$, and $N_{RB}^{BWP}$ represents a quantity of RBs of an activated uplink BWP or an activated downlink BWP. As shown in FIG. 9b, $N_{RB}^{BWP}=11$, and therefore $\lceil \log_2(N_{RB}^{BWP}(N_{RB}^{BWP}+1)/2) \rceil=7$. When $\lceil \log_2(N_{RB}^{BWP}(N_{RB}^{BWP}+1)/2) \rceil$ bits are all 1, bits in a time domain resource assignment field indicate minimum K0 or minimum K2. For example, $N_{RB}^{BWP}=11$, and therefore 7 bits of the quantity of bits in the frequency domain resource assignment field are 1111111. If a frequency hopping flag (frequency hopping flag) field further exists in the downlink control information, a bit in the frequency hopping flag field is set to "disabled (disabled)".

(c) A network side device configures a frequency domain resource assignment manner type 0 and a frequency domain resource assignment manner type 1 by using RRC signaling, and therefore a quantity of bits in a frequency domain resource assignment field is $\max(\lceil \log_2(N_{RB}^{BWP}(N_{RB}^{BWP}+1)/2) \rceil, N_{RBG})+1$. One bit of most significant bits (most significant bit, MSB) of the frequency domain resource assignment field may dynamically indicate whether a current frequency domain resource assignment manner is the type 0 or type 1. When the one bit of the MSBs is "0", it indicates that the current frequency domain resource assignment manner is the type 0, or when the one bit of the MSBs is "1", it indicates that the current frequency domain resource assignment manner is the type 1. If the dynamically indicated frequency domain resource assignment manner is the type 0, when $N_{RBG}$ bits of least significant bits (least significant bit, LSB) or $max(\lceil log_2(N_{RB}^{BWP}(N_{RB}^{BWP}+1)/2)\rceil, N_{RBG})$ bits of LSBs are all 0, bits in a time domain resource assignment field indicate minimum K0 or minimum K2. If the dynamically indicated frequency domain resource assignment manner is the type 1, when $\lceil log_2(N_{RB}^{BWP}(N_{RB}^{BWP}+1)/2)\rceil$ bits of LSBs or $max(\lceil log_2(N_{RB}^{BWP}(N_{RB}^{BWP}+1)/2)\rceil, N_{RBG})$ bits of LSBs are all 1, bits in a time domain resource assignment field indicate minimum K0 or minimum K2. If a frequency hopping flag field further exists in the downlink control information, a bit in the frequency hopping flag field is set to "disabled".

For another example, when the modulation and coding scheme field indicates a value in MCS index numbers corresponding to a mark "reserved (reserved)" in an MCS table, for example, MCS index numbers 28 to 31 in Table 1 that is an example MCS table; an NDI indicates 0; and/or an RV indicates 0, the value of the time domain resource assignment field indicates minimum K0 or minimum K2. Which fields of the first field are set to set values may be determined based on an actual requirement. It may be understood that the one or more fields in the first field are the first set values, and all the fields may correspond to a same first set value or different first set values.

TABLE 1

| MCS index number $I_{MCS}$ | Modulation order $Q_m$ | Bit rate Rx [1024] | Spectral efficiency |
| --- | --- | --- | --- |
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3773 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 27 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | Reserved | |
| 29 | 4 | Reserved | |
| 30 | 6 | Reserved | |
| 31 | 8 | Reserved | |

In another implementation, S402 includes: obtaining a preconfigured or predefined minimum slot offset value when one or more fields in the first field of the downlink control information are first set values. Different from the foregoing implementation, in this implementation, the minimum slot offset value is a preconfigured or predefined value, and the field in the downlink control information does not need to explicitly indicate the minimum slot offset value. Therefore, when the one or more fields in the first field are the first set values, it is determined that the minimum slot offset value is the preconfigured or predefined minimum slot offset value.

Optionally, the network device may also determine the minimum slot offset value based on the first field of the downlink control information.

In this embodiment of this application, when the one or more fields in the first field of the downlink control information are the first set values, the downlink control information is not actually used for data scheduling, but the UE can still feed back an HARQ-ACK based on an ACK/a NACK resource indicated in the downlink control information. For example, for the downlink control information, the terminal device always feeds back an ACK or always feeds back a NACK.

According to the communication method provided in this embodiment of this application, the first field of the downlink control information is reused to determine the minimum slot offset value, so that a quantity of bits of the control information is not increased and overheads of the control information are reduced, and further signaling reliability can be improved based on HARQ-ACK feedback.

In the conventional technology, after a network device sends first downlink control information that carries a minimum slot offset value, the minimum slot offset value can be applied/validated only after a period of time. However, the network device may send second downlink control information to a terminal device before the minimum slot offset value carried on the first downlink control information is applied/validated. Both the first downlink control information and the second downlink control information are used to indicate minimum slot offset values. Therefore, the terminal device does not know how to determine an actual minimum slot offset value.

Figure 11:
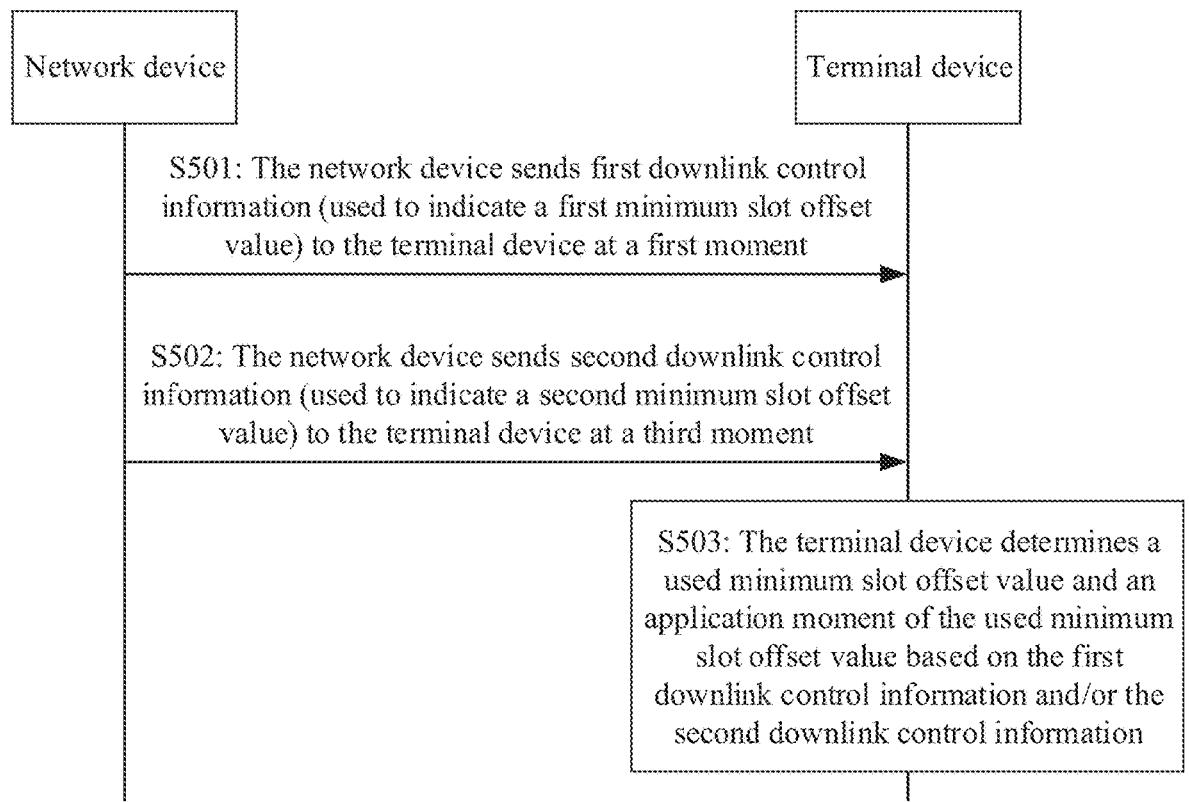
FIG. 11 is a schematic flowchart of another communication method according to an embodiment of this application.

FIG. 11 is a schematic flowchart of another communication method according to an embodiment of this application. For example, the method may include the following steps.

S501: A network device sends first downlink control information to a terminal device at a first moment.

Correspondingly, the terminal device receives the first downlink control information at the first moment.

The first downlink control information is used to indicate a first minimum slot offset value. For a manner of determining the first minimum slot offset value based on the first downlink control information, refer to the foregoing embodiment.

Assuming that the terminal device receives an indication of the first minimum slot offset value in a slot n, the terminal device applies/validates the first minimum slot offset value in a slot n+K or after a slot n+K. The first minimum slot offset value cannot be used before the slot n+K. K may be greater than 0.

The network device dynamically switches/indicates the first minimum slot offset value, and there is a time interval between indication signaling and validation of a new first minimum slot offset value. The time interval is referred to as application time/validation time K. For example, as described in the foregoing embodiment, the new first minimum slot offset value is applied/validated only after the terminal device feeds back a HARQ-ACK or sends a PUSCH, in other words, K depends on a time interval between the downlink control information and the HARQ-ACK feedback or the PUSCH. For another example, K is equal to an old first minimum slot offset value, or it is represented that the new first minimum slot offset value has not been validated, and K is a currently valid first minimum slot offset value. A value of K may alternatively be related to a PDCCH decoding time. A slot obtained by adding the time interval to a slot in which the indication signaling is located is referred to as an application moment or a validation moment. Before the new first minimum slot offset value is validated, the network device and the terminal device still schedule data based on the old first minimum slot offset value.

Therefore, the terminal device receives the first downlink control information at the first moment, the first downlink control information is not immediately applied, and an application moment of the first downlink control information is not earlier than a second moment. The second moment is later than the first moment, and there is a specific time interval between the second moment and the first moment.

Figure 12:
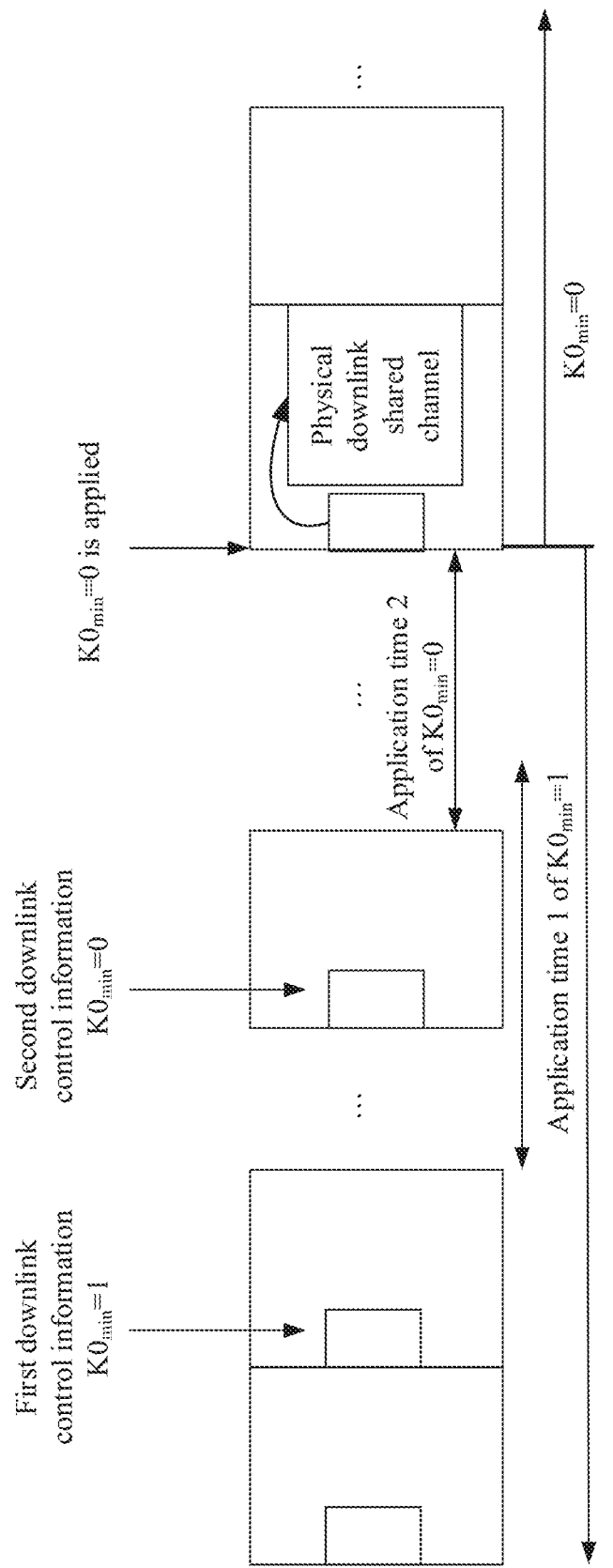
FIG. 12 is a schematic application diagram of downlink control information.

FIG. 12 is a schematic application diagram of downlink control information. Currently, a minimum slot offset value for receiving a PDSCH is $K0_{min}=2$, first DCI is received, the first DCI indicates $K0_{min}=1$, and an application moment of the first DCI or $K0_{min}=1$ is an end moment of application time 1 shown in the figure, in other words, $K0_{min}=2$ is still used before the application time 1 ends, and a new minimum slot offset value is used after the application time 1 ends.

Optionally, a start location of application time of the new minimum slot offset value may be a start location of a symbol or slot in which DCI is located, or an end location of a symbol or slot in which DCI is located.

S502: The network device sends second downlink control information to the terminal device at a third moment.

Correspondingly, the terminal device receives the second downlink control information at the third moment.

Before the first downlink control information is applied, the terminal device receives new downlink control information, namely, the second downlink control information, at the third moment. The third moment is between the first moment and the second moment, the second downlink control information is used to indicate a second minimum slot offset value, and an application moment of the second downlink control information is not earlier than a fourth moment.

Still referring to FIG. 12, after the first DCI is received, and before the first DCI or $K0_{min}=1$ is applied, second DCI is further received, the second DCI indicates $K0_{min}=0$, and an application moment of the second DCI or $K0_{min}=0$ is an end moment of application time 2 shown in the figure, and the end moment of the application time 2 is later than the application time 1.

S503: The terminal device determines a used minimum slot offset value and an application moment of the used minimum slot offset value based on the first downlink control information and/or the second downlink control information, where the used minimum slot offset value is one of the first minimum slot offset value and the second minimum slot offset value, and the application moment is not earlier than one of the second moment and the fourth moment.

In an embodiment, regardless of whether the first minimum slot offset value is the same as the second minimum slot offset value, the terminal device determines that a second minimum slot offset value indicated by the latest DCI (namely, the second DCI) is the used minimum slot offset value, and determines that an end moment of application time of the second minimum slot offset value is the application moment of the used minimum slot offset value. In other words, timing of application time of the used minimum slot offset value is updated from a start location of the first DCI to a start location of the second DCI, or the application moment of the used minimum slot offset value is updated from an end location of the first DCI to an end location of the second DCI.

As shown in FIG. 12, it is finally determined that the used minimum slot offset value is $K0_{min}=0$ and the application moment of the used minimum slot offset value is the end moment of the application time 2.

In another embodiment, if the first minimum slot offset value is different from the second minimum slot offset value, the terminal device determines that a second minimum slot offset value indicated by the latest DCI (namely, the second DCI) is the used minimum slot offset value, and determines that an end moment of application time of the second minimum slot offset value is the application moment of the used minimum slot offset value.

In still another case, if the first minimum slot offset value is the same as the second minimum slot offset value, the terminal device does not update an application moment, and still uses, as the used minimum slot offset value, the first minimum slot offset value indicated by the first DCI, and determines that an end moment of application time of the first minimum slot offset value is the application moment of the used minimum slot offset value.

It may be understood that the procedures in this embodiment and the embodiment shown in FIG. 10 may be independent from each other, or may be combined together. The embodiment shown in FIG. 10 mainly describes how to determine a used minimum slot offset value. In addition to describing how to determine a used minimum slot offset value, FIG. 11 further describes determining an application moment of the used minimum slot offset value.

According to the communication method provided in this embodiment of this application, if the second downlink control information is further received before the first downlink control information is applied/validated, the used minimum slot offset value and the application moment of the used minimum slot offset value are determined based on the first downlink control information and/or the second downlink control information, to resolve a conflict between minimum slot offset values indicated by a plurality of pieces of downlink control information.

If a terminal device supports configuration of a plurality of bandwidth parts (bandwidth part, BWP), different BWPs have different time domain resource assignment sets, and a minimum slot offset value of a first BWP is not necessarily applicable to a second BWP, a network device may switch a BWP while scheduling data. Therefore, a problem of how to indicate a minimum slot offset value of a switched BWP needs to be resolved.

Figure 13:
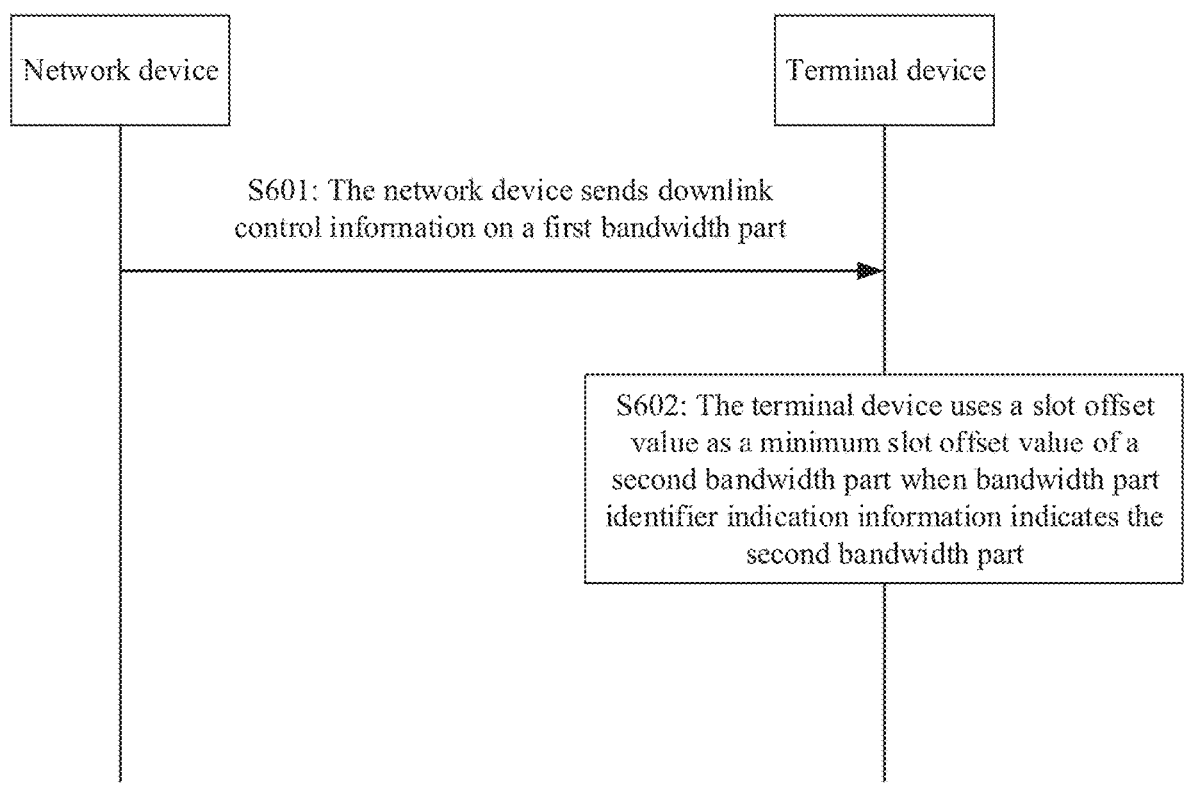
FIG. 13 is a schematic flowchart of another communication method according to an embodiment of this application.

FIG. 13 is a schematic flowchart of another communication method according to an embodiment of this application. For example, the method may include the following steps.

S601: A network device sends downlink control information on a first bandwidth part, where the downlink control information includes a slot offset value and BWP identifier indication information.

Correspondingly, the terminal device receives the downlink control information on the first BWP.

If the network device configures a plurality of BWPs for the terminal device, the network device may switch a BWP while scheduling data. The network device sends first DCI on the first BWP. The first DCI includes a slot offset value for scheduling a PDSCH or PUSCH and BWP identifier indication information. The BWP identifier indication information indicates an identifier of a BWP for PDSCH or PUSCH data transmission. If the BWP identifier indication information includes an identifier of the first BWP, it indicates that the BWP is not to be switched, data is still transmitted on the first BWP, and the terminal device still works on the first BWP. If the BWP identifier indication information includes an identifier of another BWP, for example, an identifier of a second BWP, it indicates that the first BWP is to be switched to the second BWP, in other words, the second BWP is to be activated, and the terminal device is to work on the second BWP and perform data transmission on the second BWP.

S602: The terminal device uses the slot offset value as a minimum slot offset value of the second BWP when the BWP identifier indication information indicates the second BWP.

When the BWP identifier indication information indicates the second BWP, in other words, the terminal device is to switch from the first BWP to the second BWP for data transmission, the terminal device still uses, as the minimum slot offset value of the second BWP, the slot offset value indicated by the first DCI. Correspondingly, the network device uses, as the minimum slot offset value of the second BWP, the slot offset value indicated in the first DCI. In this way, the network device does not need to send control information on the second BWP after the second BWP is activated, to re-indicate a minimum slot offset value of the second BWP, thereby saving signaling overheads and improving communication efficiency.

Specifically, the downlink control information is further used to indicate the terminal device to receive a PDSCH or send a PUSCH on the second BWP at a first moment. Correspondingly, the network device sends the PDSCH or receives the PUSCH on the second BWP at the first moment. The first moment is a slot obtained by adding slots whose quantity is the slot offset value indicated by the first DCI to a receive slot of the downlink control information. For example, if the terminal device receives the DCI in a slot n, the first moment is a slot obtained by adding shift to n, where shift is the slot offset value for scheduling a PDSCH or PUSCH by using the first DCI.

Optionally, in another embodiment, when the BWP identifier indication information indicates the first BWP, if the slot offset value is less than a minimum slot offset value of the first BWP, the network device sends a PDSCH or receives a PUSCH at a second moment, and correspondingly, the terminal device receives the PDSCH or sends the PUSCH at the second moment. The second moment is a slot obtained by adding slots whose quantity is the minimum slot offset value of the first BWP to a receive slot of the downlink control information. In addition, the terminal device uses the slot offset value as a new minimum slot offset value of the first BWP, in other words, updates the minimum slot offset value of the first BWP to the slot offset value. For application time or validation time of the new minimum slot offset value, refer to the foregoing embodiment.

In other words, the BWP is not switched, currently, data is transmitted at the second moment by using the minimum slot offset value of the first BWP, and a transmission slot of the PDSCH or PUSCH scheduled by using the DCI is the slot obtained by adding slots whose quantity is the minimum slot offset value of the first BWP to the receive slot of the DCI.

Figure 14:
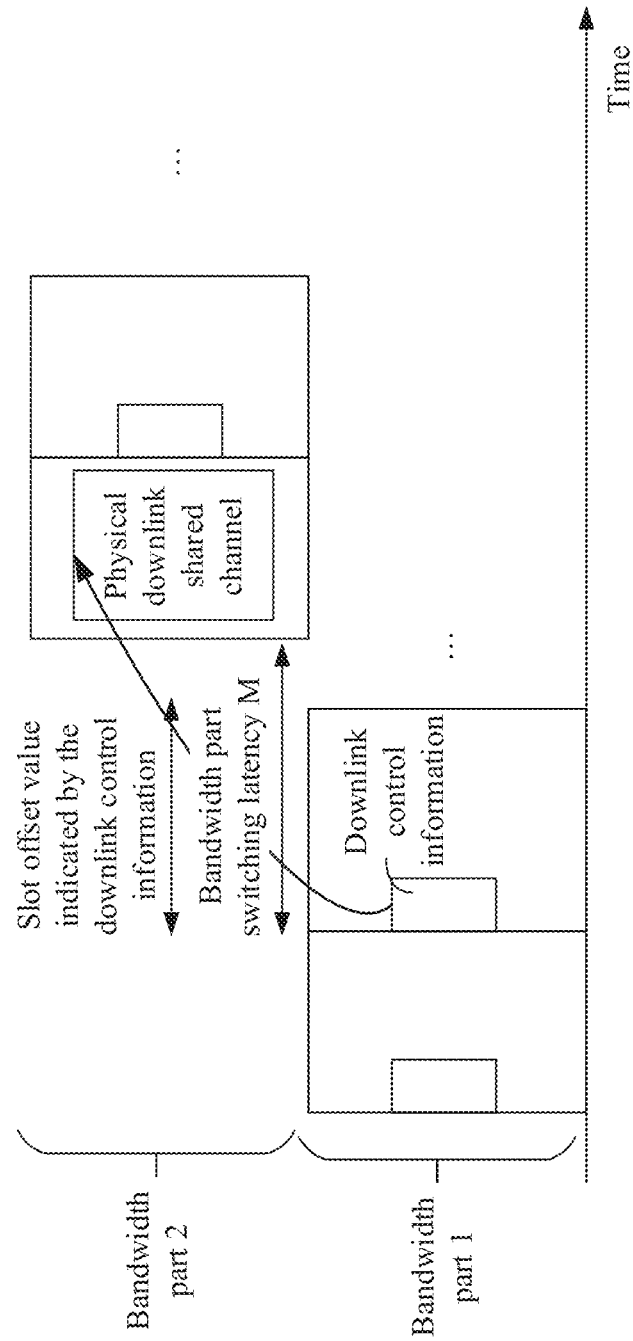
FIG. 14 is a schematic diagram of bandwidth part switching.

Optionally, in another embodiment, when the BWP identifier indication information indicates the second BWP, if the slot offset value for scheduling a PDSCH or PUSCH by using the downlink control information is less than a latency required for BWP switching, where the latency required for BWP switching may also be represented as a slot required for BWP switching, data is transmitted in a slot obtained by adding the slot required for BWP switching to a receive slot of the downlink control information. Therefore, if the slot offset value is less than the latency required for BWP switching, the network device sends a PDSCH or receives a PUSCH in the slot obtained by adding the slot required for BWP switching to the receive slot of the downlink control information. Correspondingly, the terminal device receives the PDSCH or sends the PUSCH in the slot obtained by adding the slot required for BWP switching to the receive slot of the downlink control information. For example, as shown in FIG. 14 that is a schematic diagram of BWP switching, the terminal device receives DCI on a first BWP in a slot n, where BWP identifier indication information of the DCI indicates a second BWP, a slot offset value indicated by the DCI is X, and X is less than M. Therefore, the terminal device receives a PDSCH or sends a PUSCH in a slot obtained by adding M to n, where M is a slot required for BWP switching.

As shown in the schematic diagram of BWP switching in FIG. 14, downlink scheduling is used as an example. If the slot offset value indicated in the DCI on the BWP 1 is less than the BWP switching latency M, the terminal device receives the PDSCH on the BWP 2 in the slot obtained by adding slots whose quantity is the switching latency M to the receive slot of the DCI, and uses the slot offset value as a minimum slot offset value for scheduling a PDSCH on the BWP 2 by using the DCI.

It may be understood that the procedure in the embodiment shown in FIG. 13 may also run independently of or in combination with the procedure in the foregoing embodiment.

According to the communication method provided in this embodiment of this application, when the BWP is dynamically switched, a minimum slot offset value of a target BWP may be indicated, so that no new bit needs to be added, and a scheduling opportunity is not affected and a transmission latency is reduced. When the BWP is not switched, no new bit field needs to be added, a minimum slot offset value may be updated from a larger value to a smaller value, and a scheduling opportunity is not affected and a transmission latency is reduced. If the base station and the UE expect to switch a minimum slot offset value from a smaller value to a larger value, the base station and the UE may use the foregoing embodiment.

The foregoing describes the method in the embodiments of this application in detail, and the following provides an apparatus in the embodiments of this application.

Figure 15:
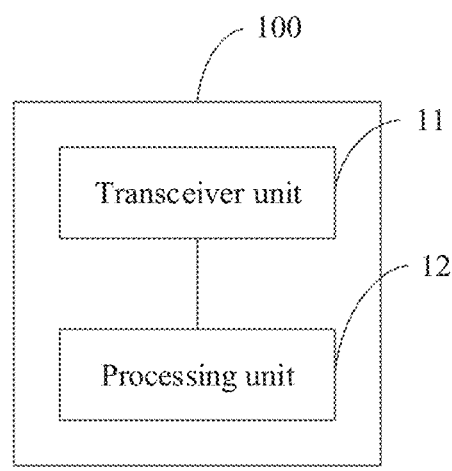
FIG. 15 is a schematic structural diagram of a communications apparatus according to an embodiment of this application.

Based on a same concept as the communication method in the foregoing embodiment, as shown in FIG. 15, an embodiment of this application further provides a communications apparatus 100. The communications apparatus 100 may be applied to the foregoing communication method shown in FIG. 2, FIG. 6, FIG. 8, FIG. 10, FIG. 11, or FIG. 13. The communications apparatus 100 may be the terminal device shown in FIG. 1, or may be a component (such as a chip) applied to the terminal device. The communications apparatus 100 includes a transceiver unit 11 and a processing unit 12.

For example, in an embodiment, the transceiver unit 11 is configured to receive first information from a network device at first time, where the first information is carried on a first physical downlink control channel PDCCH, a first physical downlink shared channel PDSCH is scheduled through the first PDCCH based on a first time domain resource assignment set at the first time, the first information is used to determine a second time domain resource assignment set for scheduling a second PDSCH after the first time, and the first PDCCH that carries the first information further includes scheduling information of the first PDSCH.

The transceiver unit 11 is further configured to receive data sent by the network device through the first PDSCH.

The transceiver unit 11 is further configured to send feedback information of the data to the network device.

The processing unit 12 is configured to schedule the second PDSCH based on the second time domain resource assignment set at second time after the feedback information of the data is sent, where the second time is later than the first time.

In an implementation, the first PDCCH that carries the first information does not include the scheduling information of the first PDSCH.

The transceiver unit 11 is further configured to send feedback information of the first PDCCH to the network device.

The processing unit 12 is further configured to schedule the second PDSCH based on the second time domain resource assignment set at third time after the feedback information of the first PDCCH is sent.

For more detailed descriptions about the transceiver unit 11 and the processing unit 12, refer to the related descriptions of the terminal device in the foregoing method embodiment shown in FIG. 2. Details are not described herein again. It should be noted that the transceiver unit may be an integrated component with a sending/receiving function, or may include an independent receiving unit and sending unit respectively with a receiving function and a sending function, which are logically referred to as a "transceiver unit".

For example, in another embodiment, the transceiver unit 11 is configured to receive first information from a network device at first time, where the first information is carried on a first physical downlink control channel PDCCH, the first PDCCH includes scheduling information of a first physical uplink shared channel PUSCH, the first PUSCH is scheduled based on a first time domain resource assignment set at the first time, and the first information is used to determine a second time domain resource assignment set for scheduling a second PUSCH after the first time.

The transceiver unit 11 is further configured to send data to the network device through the first PUSCH based on the scheduling information of the first PUSCH.

The processing unit 12 is configured to schedule the second PUSCH based on the second time domain resource assignment set at second time after the data is sent, where the second time is later than the first time.

For more detailed descriptions about the transceiver unit 11 and the processing unit 12, refer to the related descriptions of the terminal device in the foregoing method embodiment shown in FIG. 6. Details are not described herein again.

For example, in another embodiment, the transceiver unit 11 is configured to receive first information from a network device at first time, where the first information is carried on a first physical downlink control channel PDCCH, and a first physical downlink shared channel PDSCH or a first physical uplink shared channel PUSCH is scheduled through the first PDCCH based on a first time domain resource assignment set at the first time.

The processing unit 12 is configured to determine, based on bits in a time domain resource assignment field of the first PDCCH when bits in a frequency domain resource assignment field of the first PDCCH are all 0, a second time domain resource assignment set for scheduling a second PDSCH or a second PUSCH after the first time.

The processing unit 12 is further configured to schedule the second PDSCH or the second PUSCH based on the determined first time domain resource assignment set at a second time, where the second time is later than the first time.

In an implementation, the processing unit 12 is configured to determine a minimum slot offset value or an index of a minimum slot offset value in the first time domain resource assignment set based on the bits in the time domain resource assignment field of the first PDCCH when the bits in the frequency domain resource assignment field of the first PDCCH are all 0.

For more detailed descriptions about the transceiver unit 11 and the processing unit 12, refer to the related descriptions of the terminal device in the foregoing method embodiment shown in FIG. 8. Details are not described herein again.

For example, in another embodiment, the transceiver unit 11 is configured to receive first downlink control information from a network device, where the first downlink control information is carried on a first physical downlink control channel PDCCH; and the processing unit 12 is configured to determine a first minimum slot offset value based on a first field of the first downlink control information, where the first field includes at least one of the following fields: a frequency domain resource assignment field, a time domain resource assignment field, a modulation and coding scheme field, a new data indicator field, or a redundancy version field, and the first minimum slot offset value represents a minimum available slot offset value for receiving a physical downlink shared channel PDSCH or sending a physical uplink shared channel PUSCH.

In an implementation, the first downlink control information further includes first indication information, and the first indication information is used to indicate that the first field carries indication information of the first minimum slot offset value.

In another implementation, the processing unit 12 is configured to obtain a value of the time domain resource assignment field when one or more fields in the first field of the first downlink control information are first set values, where the value of the time domain resource assignment field is used to indicate the first minimum slot offset value.

In another implementation, the processing unit 12 is configured to obtain a preconfigured or predefined first minimum slot offset value when one or more fields in the first field of the first downlink control information are first set values.

For more detailed descriptions about the transceiver unit 11 and the processing unit 12, refer to the related descriptions of the terminal device in the foregoing method embodiment shown in FIG. 10. Details are not described herein again.

For example, in another embodiment, the transceiver unit 11 is configured to receive first downlink control information at a first moment, where the first downlink control information is used to indicate a first minimum slot offset value, and an application moment of the first downlink control information is not earlier than a second moment; the transceiver unit 11 is further configured to receive second downlink control information at a third moment, where the third moment is between the first moment and the second moment, the second downlink control information is used to indicate a second minimum slot offset value, and an application moment of the second downlink control information is not earlier than a fourth moment; and the processing unit 12 is configured to determine a used minimum slot offset value and an application moment of the used minimum slot offset value based on the first downlink control information and/or the second downlink control information, where the used minimum slot offset value is one of the first minimum slot offset value and the second minimum slot offset value, and the application moment is not earlier than one of the second moment and the fourth moment.

For more detailed descriptions about the transceiver unit 11 and the processing unit 12, refer to the related descriptions of the terminal device in the foregoing method embodiment shown in FIG. 11. Details are not described herein again.

For example, in another embodiment, the transceiver unit 11 is configured to receive downlink control information on a first bandwidth part BWP, where the downlink control information includes a slot offset value and BWP identifier indication information; and the processing unit 12 is configured to use the slot offset value as a minimum slot offset value of a second BWP when the BWP identifier indication information indicates the second BWP.

In an implementation, the downlink control information is further used to indicate to receive a physical downlink shared channel PDSCH or send a physical uplink shared channel PUSCH on the second BWP at a first moment, and the first moment is a slot obtained by adding slots whose quantity is the slot offset value to a receive slot of the downlink control information.

In another implementation, the transceiver unit 11 is configured to: when the BWP identifier indication information indicates the first BWP, if the slot offset value is less than a minimum slot offset value of the first BWP, receive a PDSCH or send a PUSCH at a second moment, where the second moment is a slot obtained by adding slots whose quantity is the minimum slot offset value of the first BWP to a receive slot of the downlink control information; and the processing unit 12 is configured to use the slot offset value as a new minimum slot offset value of the first BWP.

In another implementation, the transceiver unit 11 is configured to: if the slot offset value is less than a latency required for BWP switching, receive a PDSCH or send a PUSCH in a slot obtained by adding the latency required for BWP switching to a receive slot of the downlink control information.

For more detailed descriptions about the transceiver unit 11 and the processing unit 12, refer to the related descriptions of the terminal device in the foregoing method embodiment shown in FIG. 13. Details are not described herein again.

Figure 16:
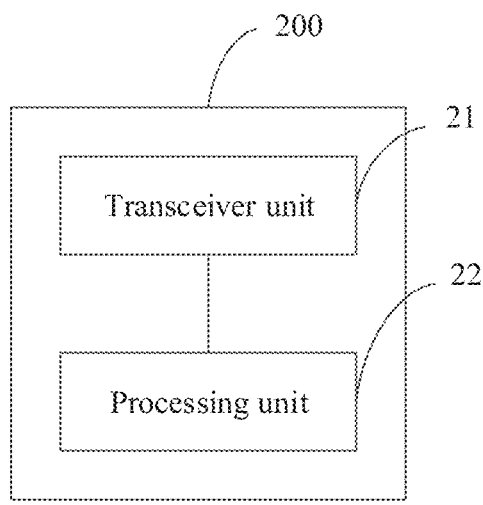
FIG. 16 is a schematic structural diagram of another communications apparatus according to an embodiment of this application.

Based on a same concept as the communication method in the foregoing embodiment, as shown in FIG. 16, an embodiment of this application further provides a communications apparatus 200. The communications apparatus 200 may be applied to the foregoing communication method shown in FIG. 2, FIG. 6, FIG. 8, FIG. 10, FIG. 11, or FIG. 13. The communications apparatus 200 may be the network device shown in FIG. 1, or may be a component (such as a chip) applied to the network device. The communications apparatus 200 includes a transceiver unit 21 and a processing unit 22.

For example, in an embodiment, the transceiver unit 21 is configured to send first information to a terminal device at first time, where the first information is carried on a first physical downlink control channel PDCCH, a first physical downlink shared channel PDSCH is scheduled through the first PDCCH based on a first time domain resource assignment set at the first time, the first information is used to determine a second time domain resource assignment set for scheduling a second PDSCH after the first time, and the first PDCCH that carries the first information further includes scheduling information of the first PDSCH.

The transceiver unit 21 is further configured to send data to the terminal device through the first PDSCH.

The transceiver unit 21 is further configured to receive feedback information of the data from the terminal device.

The processing unit 22 is configured to schedule the second PDSCH based on the second time domain resource assignment set at second time after the feedback information of the data is received, where the second time is later than the first time.

In an implementation, the first PDCCH that carries the first information does not include the scheduling information of the first PDSCH.

The transceiver unit 21 is further configured to receive feedback information of the first PDCCH from the terminal device.

The processing unit 22 is further configured to schedule the second PDSCH based on the second time domain resource assignment set at third time after the feedback information of the first PDCCH is received.

For more detailed descriptions about the transceiver unit 21 and the processing unit 22, refer to the related descriptions of the network device in the foregoing method embodiment shown in FIG. 2. Details are not described herein again. It should be noted that the transceiver unit may be an integrated component with a sending/receiving function, or may include an independent receiving unit and sending unit respectively with a receiving function and a sending function, which are logically referred to as a "transceiver unit".

For example, in another embodiment, the transceiver unit 21 is configured to send first information to a terminal device at first time, where the first information is carried on a first physical downlink control channel PDCCH, the first PDCCH includes scheduling information of a first physical uplink shared channel PUSCH, the first PUSCH is scheduled based on a first time domain resource assignment set at the first time, and the first information is used to determine a second time domain resource assignment set for scheduling a second PUSCH after the first time.

The transceiver unit 21 is further configured to receive data sent by the terminal device through the first PUSCH.

The processing unit 22 is configured to schedule the second PUSCH based on the second time domain resource assignment set at second time after the data is received, where the second time is later than the first time.

For more detailed descriptions about the transceiver unit 21 and the processing unit 22, refer to the related descriptions of the network device in the foregoing method embodiment shown in FIG. 6. Details are not described herein again.

For example, in another embodiment, the transceiver unit 21 is configured to send first information to a terminal device at first time, where the first information is carried on a first physical downlink control channel PDCCH, a first physical downlink shared channel PDSCH or a first physical uplink shared channel PUSCH is scheduled through the first PDCCH based on a first time domain resource assignment set at the first time, bits in a frequency domain resource assignment field of the first PDCCH are all 0, and bits in a time domain resource assignment field of the first PDCCH are used to determine a second time domain resource assignment set for scheduling a second PDSCH or a second PUSCH after the first time.

The processing unit 22 is configured to schedule the second PDSCH or the second PUSCH based on the determined first time domain resource assignment set at second time, where the second time is later than the first time.

For more detailed descriptions about the transceiver unit 21 and the processing unit 22, refer to the related descriptions of the network device in the foregoing method embodiment shown in FIG. 8. Details are not described herein again.

For example, in another embodiment, the transceiver unit 21 is configured to send first downlink control information, where the first downlink control information is carried on a first physical downlink control channel PDCCH, a first field of the first downlink control information is used to determine a first minimum slot offset value, the first field includes at least one of the following fields: a frequency domain resource assignment field, a time domain resource assignment field, a modulation and coding scheme field, a new data indicator field, or a redundancy version field, and the first minimum slot offset value is used to represent a minimum available slot offset value for sending a physical downlink shared channel PDSCH or receiving a physical uplink shared channel PUSCH.

In an implementation, the first downlink control information further includes first indication information, and the first indication information is used to indicate that the first field carries indication information of the first minimum slot offset value.

For more detailed descriptions about the transceiver unit 21 and the processing unit 22, refer to the related descriptions of the network device in the foregoing method embodiment shown in FIG. 10. Details are not described herein again.

For example, in another embodiment, the transceiver unit 21 is configured to send the first downlink control information at a first moment, where an application moment of the first information is not earlier than a second moment; the transceiver unit 21 is further configured to send second downlink control information at a third moment, where the third moment is between the first moment and the second moment, the second downlink control information is used to indicate a second minimum slot offset value, and an application moment of the second downlink control information is not earlier than a fourth moment; and the processing unit 22 is configured to determine a used minimum slot offset value and an application moment of the used minimum slot offset value based on the first downlink control information and/or the second downlink control information, where the used minimum slot offset value is one of the first minimum slot offset value and the second minimum slot offset value, and the application moment is not earlier than one of the second moment and the fourth moment.

For more detailed descriptions about the transceiver unit 21 and the processing unit 22, refer to the related descriptions of the network device in the foregoing method embodiment shown in FIG. 11. Details are not described herein again.

For example, in another embodiment, the transceiver unit 21 is configured to send downlink control information on a first bandwidth part BWP, where the downlink control information includes a slot offset value and BWP identifier indication information; and the processing unit 22 is configured to use the slot offset value as a minimum slot offset value of a second BWP when the BWP identifier indication information indicates the second BWP.

In an implementation, the downlink control information is further used to indicate to send a physical downlink shared channel PDSCH or receive a physical uplink shared channel PUSCH on the second BWP at a first moment, and the first moment is a slot obtained by adding slots whose quantity is the slot offset value to a receive slot of the downlink control information.

In another implementation, the transceiver unit 21 is configured to: when the BWP identifier indication information indicates the first BWP, if the slot offset value is less than a minimum slot offset value of the first BWP, send a PDSCH or receive a PUSCH at a second moment, where the second moment is a slot obtained by adding slots whose quantity is the minimum slot offset value of the first BWP to a receive slot of the downlink control information; and the processing unit 22 is configured to use the slot offset value as a new minimum slot offset value of the first BWP.

In another implementation, the transceiver unit 21 is configured to: if the slot offset value is less than a latency required for BWP switching, send a PDSCH or receive a PUSCH in a slot obtained by adding the latency required for BWP switching to a receive slot of the downlink control information.

For more detailed descriptions about the transceiver unit 21 and the processing unit 22, refer to the related descriptions of the network device in the foregoing method embodiment shown in FIG. 13. Details are not described herein again.

An embodiment of this application further provides a communications apparatus. The communications apparatus is configured to execute the foregoing communication method. A part or all of the foregoing communication method may be implemented by using hardware, or may be implemented by using software.

Optionally, during specific implementation, the communications apparatus may be a chip or an integrated circuit.

Optionally, when a part or all of the communication method in the foregoing embodiment is implemented by using software, the communications apparatus includes a processor, configured to execute a program. When the program is executed, the communications apparatus is enabled to implement the communication method provided in the foregoing embodiment. The communications apparatus may further include a memory, configured to store a necessary program. The program may be loaded into the memory when the communications apparatus is delivered, or may be loaded into the memory as required subsequently.

Optionally, the memory may be a physically independent unit, or may be integrated into the processor.

Optionally, when a part or all of the communication method in the foregoing embodiment is implemented by using software, the communications apparatus may include only a processor. A memory configured to store a program is located outside the communications apparatus. The processor is connected to the memory by using a circuit/wire, and is configured to read and execute the program stored in the memory.

The processor may be a central processing unit (central processing unit, CPU), a network processor (network processor, NP), or a combination of a CPU and an NP.

Optionally, the processor may include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), generic array logic (generic array logic, GAL), or any combination thereof.

The memory may include a volatile memory (volatile memory), for example, a random access memory (random access memory, RAM); or the memory may include a nonvolatile memory (nonvolatile memory), for example, a flash memory (flash memory), a hard disk drive (hard disk drive, HDD), or a solid-state drive (solid-state drive, SSD); or the memory may include a combination of the foregoing types of memories.

Figure 17:
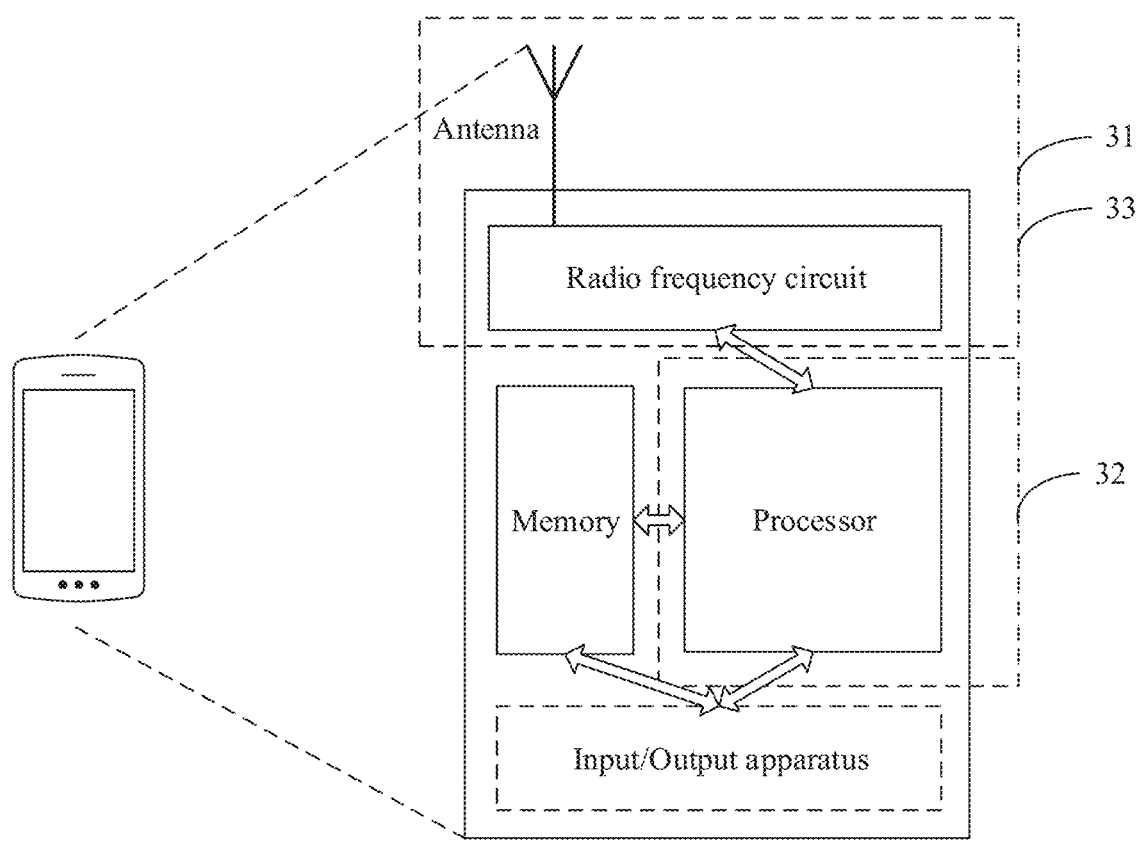
FIG. 17 is a schematic structural diagram of a simplified terminal device according to an embodiment of this application.

FIG. 17 is a schematic structural diagram of a simplified terminal device. For ease of understanding and illustration, in FIG. 17, for example, the terminal device is a mobile phone. As shown in FIG. 17, the terminal device includes a processor, and may further include a radio frequency circuit, an antenna, and an input/output apparatus. The processor may be configured to process a communications protocol and communication data, and may be further configured to control the terminal device, execute a software program, process data of the software program, and the like. The terminal device may further include a memory. The memory is mainly configured to store a software program and data. The program may be loaded into the memory when the communications apparatus is delivered, or may be loaded into the memory as required subsequently. The radio frequency circuit is mainly configured to: perform conversion between a baseband signal and a radio frequency signal, and process the radio frequency signal. The antenna is mainly configured to send/receive a radio frequency signal in an electromagnetic wave form. The input/output apparatus, such as a touchscreen, a display screen, or a keyboard, is mainly configured to receive data entered by a user and output data to the user. It should be noted that terminal devices of some types may not have the input/output apparatus.

When data needs to be sent, the processor performs baseband processing on the to-be-sent data and then outputs a baseband signal to the radio frequency circuit, and the radio frequency circuit performs radio frequency processing on the baseband signal and then sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data. For ease of description, FIG. 17 shows only one memory and processor. In an actual terminal device product, there may be one or more processors and one or more memories. The memory may also be referred to as a storage medium, a storage device, or the like. The memory may be disposed independently of the processor, or may be integrated into the processor. This is not limited in this embodiment of this application.

In this embodiment of this application, the antenna and the radio frequency circuit that have a sending/receiving function may be considered as a receiving unit and a sending unit of the terminal device (or may be collectively referred to as a transceiver unit), and the processor that has a processing function may be considered as a processing unit of the terminal device. As shown in FIG. 17, the terminal device includes a receiving unit 31, a processing unit 32, and a sending unit 33. The receiving unit 31 may also be referred to as a receiver, a receiver device, a receiver circuit, or the like. The sending unit 33 may also be referred to as a sender, a transmitter, a transmitter device, a transmitter circuit, or the like. The processing unit may also be referred to as a processor, a processing board, a processing module, a processing apparatus, or the like.

For example, in an embodiment, the receiving unit 31 is configured to execute the functions of the terminal device in steps S101 and S102 in the embodiment shown in FIG. 2, the sending unit 33 is configured to execute the function of the terminal device in step S103 in the embodiment shown in FIG. 2, and the processing unit 32 is configured to execute step S104 in the embodiment shown in FIG. 2.

For example, in another embodiment, the receiving unit 31 is configured to execute the function of the terminal device in step S201 in the embodiment shown in FIG. 6, the sending unit 33 is configured to execute the function of the terminal device in step S202 in the embodiment shown in FIG. 6, and the processing unit 32 is configured to execute step S203 in the embodiment shown in FIG. 6.

For example, in another embodiment, the receiving unit 31 is configured to execute the function of the terminal device in step S301 in the embodiment shown in FIG. 8, and the processing unit 32 is configured to execute steps S302 and S303 in the embodiment shown in FIG. 8.

For example, in another embodiment, the receiving unit 31 is configured to execute the function of the terminal device in step S401 in the embodiment shown in FIG. 10, and the processing unit 32 is configured to execute step S402 in the embodiment shown in FIG. 10.

For example, in another embodiment, the receiving unit 31 is configured to execute the functions of the terminal device in steps S501 and S502 in the embodiment shown in FIG. 11, and the processing unit 32 is configured to execute step S503 in the embodiment shown in FIG. 11.

For example, in another embodiment, the receiving unit 31 is configured to execute step S601 in the embodiment shown in FIG. 12, and the processing unit 32 is configured to execute step S602 in the embodiment shown in FIG. 12.

Figure 18:
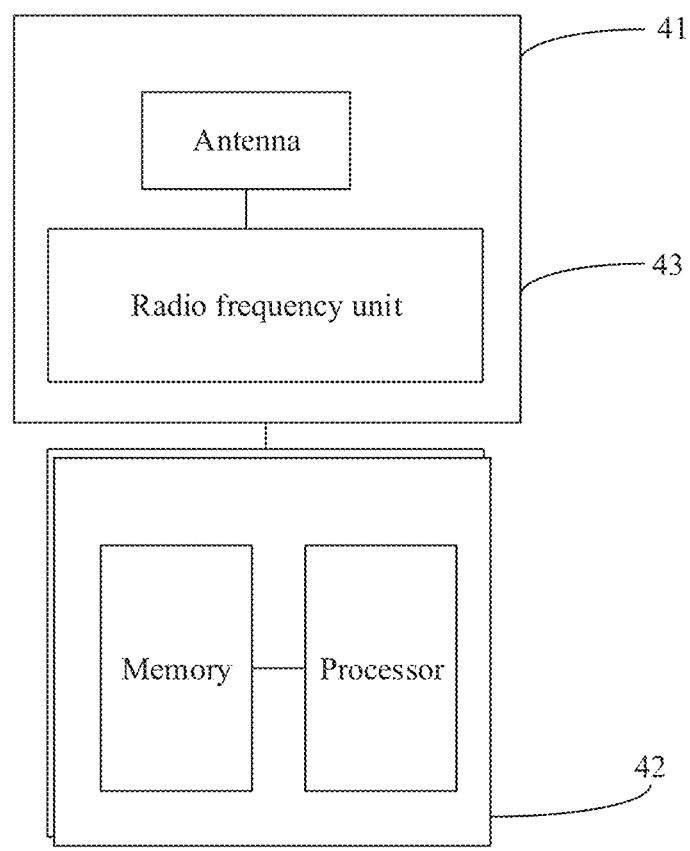
FIG. 18 is a schematic structural diagram of a simplified network device according to an embodiment of this application.

FIG. 18 is a schematic structural diagram of a simplified network side device. The network side device includes a radio frequency signal sending/receiving and conversion part and a 42 part, and the radio frequency signal sending/receiving and conversion part further includes a receiving unit 41 part and a sending unit 43 part (which may also be collectively referred to as a transceiver unit). The radio frequency signal sending/receiving and conversion part is mainly configured to: send/receive a radio frequency signal, and perform conversion between a radio frequency signal and a baseband signal. The 42 part is mainly configured to: perform baseband processing, control the network side device, and the like. The receiving unit 41 may also be referred to as a receiver, a receiver device, a receiver circuit, or the like. The sending unit 43 may also be referred to as a sender, a transmitter, a transmitter device, a transmitter circuit, or the like. The 42 part is usually a control center of the network side device, may be usually referred to as a processing unit, and is configured to control the network side device to execute the steps executed by the network side device in FIG. 4, FIG. 6, or FIG. 8. For details, refer to the descriptions of the forgoing related parts.

The 42 part may include one or more boards. Each board may include one or more processors and one or more memories. The processor is configured to read and execute a program in the memory, to implement a baseband processing function and control the network side device. If there are a plurality of boards, the boards may be connected to increase a processing capability. In an optional implementation, a plurality of boards may share one or more processors, or a plurality of boards share one or more memories, or a plurality of boards simultaneously share one or more processors.

For example, in an embodiment, the sending unit 43 is configured to execute the functions of the network device in steps S101 and S102 in the embodiment shown in FIG. 2, and the receiving unit 41 is configured to execute the function of the network device in step S103 in the embodiment shown in FIG. 2.

For example, in another embodiment, the sending unit 43 is configured to execute the function of the network device in step S201 in the embodiment shown in FIG. 6, and the receiving unit 41 is configured to execute the function of the network device in step S202 in the embodiment shown in FIG. 6.

For example, in another embodiment, the sending unit 43 is configured to execute the function of the network device in step S301 in the embodiment shown in FIG. 8.

For example, in another embodiment, the sending unit 43 is configured to execute the function of the network device in step S401 in the embodiment shown in FIG. 10.

For example, in another embodiment, the sending unit 43 is configured to execute the functions of the network device in steps S501 and S502 in the embodiment shown in FIG. 11.

For example, in another embodiment, the sending unit 43 is configured to execute the function of the network device in step S601 in the embodiment shown in FIG. 12.

It may be clearly understood by a person skilled in the art that, for the purpose of convenient and brief description, for specific working processes of the foregoing system, apparatus, and unit, refer to the corresponding processes in the foregoing method embodiments. Details are not described herein again.

In the embodiments provided in this application, it should be understood that the disclosed system, apparatus, and method may be implemented in other manners. For example, division into the units is merely logical function division and may be other division during actual implementation. For example, a plurality of units or components may be combined or integrated into another system, or some features may be ignored or not executed. The displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, in other words, may be located in one location, or may be distributed on a plurality of network units. Some or all of the units may be selected based on an actual requirement to achieve the objectives of the solutions of the embodiments.

All or some of the foregoing embodiments may be implemented by using software, hardware, firmware, or any combination thereof. When the foregoing embodiments are implemented by using software, all or some of the foregoing embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, wireless, or microwave) manner. The computer-readable storage medium may be any usable medium accessible to a computer, or a data storage device, such as a server or a data center, integrating one or more usable media. The usable medium may be a read-only memory (read-only memory, ROM), a random access memory (random access memory, RAM), or a magnetic medium, such as a floppy disk, a hard disk, a magnetic tape, a magnetic disk, or an optical medium, such as a digital versatile disc (digital versatile disc, DVD), or a semiconductor medium, such as a solid-state disk (solid-state disk, SSD).

What is claimed is:

1. A communication method, wherein the method comprises:
   receiving, by a terminal device at time slot n, first downlink control information comprising a minimum slot offset value, wherein the minimum slot offset value is to be applied by the terminal device at time slot n+K, where K is a positive integer;
   receiving, by the terminal device at a time after the time slot n and before the time slot n+K, second downlink control information comprising the minimum slot offset value; and
   determining, by the terminal device, to apply the minimum slot offset value received in the first downlink control information at the time slot n+K, wherein the minimum slot offset value is a minimum slot offset value of a physical downlink shared channel (PDSCH) or a physical uplink shared channel (PUSCH), and wherein a slot offset value for receiving the corresponding PDSCH or the PUSCH is greater than the minimum slot offset value.

2. The method according to claim 1, wherein K is a minimum slot offset value currently applied by the terminal device.

3. The method according to claim 1, wherein K is determined based on a decoding time of a physical downlink control channel (PDCCH), and wherein the first downlink control information and second downlink control information are received via the PDCCH.

4. The method according to claim 1, further comprising:
   determining, by the terminal device, to apply a previously obtained minimum slot offset value before the time slot n+K.

5. A communication method, wherein the method comprises:
   sending, at time slot n to a terminal device, first downlink control information comprising a minimum slot offset value, wherein the minimum slot offset value is to be applied by the terminal device at time slot n+K, where K is a positive integer; and
   sending, at a time after the time slot n and before the time slot n+K to the terminal device, second downlink control information comprising the minimum slot offset value to be applied by the terminal device at the time slot n+K, wherein the minimum slot offset value is a minimum slot offset value of a physical downlink shared channel (PDSCH) or a physical uplink shared channel (PUSCH), and wherein a slot offset value for receiving the corresponding PDSCH or the PUSCH is greater than the minimum slot offset value.

6. The method according to claim 5, wherein K is a minimum slot offset value currently applied by the terminal device.

7. The method according to claim 5, wherein K is determined based on a decoding time of a physical downlink control channel (PDCCH), and wherein the first downlink control information and second downlink control information are received via the PDCCH.

8. The method according to claim 5, further comprising:
determining, by the terminal device, to apply a previously obtained minimum slot offset value before the time slot n+K.

9. A communications apparatus, wherein the apparatus is a terminal device that comprises:
at least one processor;
one or more memories coupled to the at least one processor and storing programming instructions for execution by the at least one processor to:
receive first downlink control information comprising a minimum slot offset value, wherein the minimum slot offset value is to be applied by the communication apparatus at time slot n+K, where K is a positive integer;
receive, at a time after the time slot n and before the time slot n+K, second downlink control information comprising the minimum slot offset value; and
determine to apply the minimum slot offset value received in the first downlink control information at the time slot n+K, wherein the minimum slot offset value is a minimum slot offset value of a physical downlink shared channel (PDSCH) or a physical uplink shared channel PUSCH), and wherein a slot offset value for receiving the corresponding PDSCH or the PUSCH is greater than the minimum slot offset value.

10. The apparatus according to claim 9, wherein K is a minimum slot offset value currently applied by the terminal device.

11. The apparatus according to claim 9, wherein K is determined based on a decoding time of a physical downlink control channel (PDCCH), and wherein the first downlink control information and second downlink control information are received via the PDCCH.

12. The apparatus according to claim 9, wherein the one or more memories further storing programming instructions for execution by the at least one processor to determine to apply a previously obtained minimum slot offset value before the time slot n+K.

13. A communications apparatus, wherein the apparatus comprises:
at least one processor;
one or more memories coupled to the at least one processor and storing programming instructions for execution by the at least one processor to:
send, at time slot n to a terminal device, first downlink control information comprising a minimum slot offset value, wherein the minimum slot offset value is to be applied by the terminal device at time slot n+K, where K is a positive integer; and
send, at a time after the time slot n and before the time slot n+K to the terminal device, second downlink control information comprising the minimum slot offset value to be applied by the terminal device at the time slot n+K, wherein the minimum slot offset value is a minimum slot offset value of a physical downlink shared channel (PDSCH) or a physical uplink shared channel (PUSCH), and wherein a slot offset value for receiving the corresponding PDSCH or the PUSCH is greater than the minimum slot offset value.

14. The communications apparatus according to claim 13, wherein K is a minimum slot offset value currently applied by the terminal device.

15. The communications apparatus according to claim 13, wherein K is determined based on a decoding time of a physical downlink control channel (PDCCH), and wherein the first downlink control information and second downlink control information are received via the PDCCH.

16. The communications apparatus according to claim 13, wherein the one or more memories further storing programming instructions for execution by the at least one processor to determine to apply a previously obtained minimum slot offset value before the time slot n+K.

* * * * *

UNITED STATES PATENT AND TRADEMARK OFFICE
CERTIFICATE OF CORRECTION

| | | |
|---|---|---|
| PATENT NO. | : 12,096,428 B2 | Page 1 of 1 |
| APPLICATION NO. | : 17/492165 | |
| DATED | : September 17, 2024 | |
| INVENTOR(S) | : Wenwen Huang and Xiaolei Tie | |

It is certified that error appears in the above-identified patent and that said Letters Patent is hereby corrected as shown below:

In the Claims

In Column 37, In Line 33 Claim 9, delete "PUSCH)," and insert -- (PUSCH), --.

Signed and Sealed this
Seventeenth Day of December, 2024

Derrick Brent
*Acting Director of the United States Patent and Trademark Office*